(12) United States Patent
Gildert et al.

(10) Patent No.: US 11,461,867 B2
(45) Date of Patent: Oct. 4, 2022

(54) VISUAL INTERFACE AND COMMUNICATIONS TECHNIQUES FOR USE WITH ROBOTS

(71) Applicant: SANCTUARY COGNITIVE SYSTEMS CORPORATION, Vancouver (CA)

(72) Inventors: Suzanne Gildert, Vancouver (CA); Rodrigo Furlan, Delta (CA)

(73) Assignee: Sanctuary Cognitive Systems Corporation, Vancouver (CA)

(*) Notice: Subject to any disclaimer, the term of this patent is extended or adjusted under 35 U.S.C. 154(b) by 0 days.

(21) Appl. No.: 17/023,929

(22) Filed: Sep. 17, 2020

(65) Prior Publication Data

US 2021/0090201 A1    Mar. 25, 2021

Related U.S. Application Data

(60) Provisional application No. 62/902,824, filed on Sep. 19, 2019.

(51) Int. Cl.
| | |
|---|---|
| G06T 1/00 | (2006.01) |
| G06T 19/00 | (2011.01) |
| H04N 13/239 | (2018.01) |
| H04N 13/128 | (2018.01) |
| H04N 13/111 | (2018.01) |
| G01C 11/02 | (2006.01) |
| G01C 11/04 | (2006.01) |
| G06V 20/64 | (2022.01) |
| H04L 67/131 | (2022.01) |

(52) U.S. Cl.
CPC ............ *G06T 1/0014* (2013.01); *G01C 11/02* (2013.01); *G01C 11/04* (2013.01); *G06T 19/006* (2013.01); *G06V 20/647* (2022.01); *H04N 13/111* (2018.05); *H04N 13/128* (2018.05); *H04N 13/239* (2018.05); *G06T 2200/24* (2013.01); *H04L 67/131* (2022.05)

(58) Field of Classification Search
None
See application file for complete search history.

(56) References Cited

U.S. PATENT DOCUMENTS

| | | | |
|---|---|---|---|
| 2016/0221191 A1* | 8/2016 | Ota | B25J 9/1674 |
| 2016/0227193 A1* | 8/2016 | Osterwood | G03B 17/55 |
| 2017/0270711 A1* | 9/2017 | Schoenberg | A63F 13/213 |
| 2018/0217586 A1* | 8/2018 | Stephens, Jr. | B25J 13/087 |
| 2018/0322706 A1* | 11/2018 | Drouin | G06F 3/011 |
| 2019/0202059 A1* | 7/2019 | Patrick | G06V 30/2504 |
| 2019/0278295 A1* | 9/2019 | Matsuno | B25J 9/0006 |
| 2020/0368912 A1* | 11/2020 | Murty | B25J 9/1689 |
| 2020/0388074 A1* | 12/2020 | Kloor | G06K 9/6272 |

(Continued)

*Primary Examiner* — Heather R Jones
(74) *Attorney, Agent, or Firm* — Thomas Mahon

(57) ABSTRACT

A humanoid robot may include one or two eye resembling features in the form of image sensor(s) that capture images of at least a portion of an environment. The fields-of-view of the image sensor(s) will change as a pose (i.e., position, orientation, position and orientation) of the head, torso, or even entire humanoid robot changes. Virtual or augmented representations of the environment may be presented to a human pilot of the robot, where disorienting feeling due to latency in communications can be alleviated by reducing demand on communications channels.

19 Claims, 22 Drawing Sheets

(56) References Cited

U.S. PATENT DOCUMENTS

| | | | |
|---|---|---|---|
| 2021/0094180 A1* | 4/2021 | Szafir | G06F 3/011 |
| 2021/0200311 A1* | 7/2021 | Kerber | B25J 13/00 |
| 2021/0347053 A1* | 11/2021 | Lee | B25J 13/00 |
| 2021/0383115 A1* | 12/2021 | Alon | G06K 9/6201 |

* cited by examiner

VISUAL INTERFACE AND COMMUNICATIONS TECHNIQUES FOR USE WITH ROBOTS

TECHNICAL FIELD

The present disclosure generally relates to creating and providing a visual interface for use with robots, for example a virtual environment (e.g., virtual reality or augmented reality environment), remotely from a robot for a variety of use cases with respect to operation of the robot.

BACKGROUND

Description of the Related Art

When operating a robot through the use of a virtual or augmented reality system, a human operator is presented with images of a field of view of a portion of an environment as captured by one or more optical sensors (e.g., camera(s)). For humanoid robots, the optical sensor(s) can resemble eyes of a human, in general shape and position in a head of the robot. Thus, in some instances, the optical sensor may be referred to as the "eyes" of the robot. Movements of the operator's head are mimicked by the robot, which may change or update the field of view and hence the images presented to the operator.

The human operator and robot may be spaced far apart from one another and/or communications between the two may be delayed or subject to bandwidth limitations. As such, there may be a significant or appreciable delay or lag in communications between the two systems, resulting in discomfort or otherwise hindering use. For example, when the human operator pivots their head, the images presented to the user corresponding to the resulting change in field of view may have a significant time lag relative to the movement of the human operator. This often causes disorientation and possible nausea, and may hinder the ability of the human operator from naturally controlling the robot with any amount of speed or dexterity.

In addition, the bandwidth required to relay the video streams from the robot to a central server facility or the pilot may not be available. Thus, it may be desirable to reduce the amount of bandwidth needed to provide a clear and timely view of the environment in which the robot operates to the human operator, and preferably to do so without compromising on visual fidelity.

Furthermore, when a robot is operating autonomously (i.e., is not being piloted) and must make predictions and decisions as to what movements to make to achieve a goal, a virtual representation (e.g., virtual or augmented reality representation) may be useful to test predictions and movements before applying those predictions and/or movements in the real environment. This is in some respects similar to a process that a human performs when attempting a new activity or task. For example, in order to touch a ball, a human first imagines what movements would result in the ball being touched and only then applying those movements in the real world environment.

BRIEF SUMMARY

In summary, methods, apparatus and articles are described which create and provide a visual interface use with robots, for example a virtual environment (e.g., virtual or augmented reality environment) remotely from a robot for a variety of use cases with respect to operation of the robot.

The virtual environment may be persistent over a period of time. That is, a virtual or augmented reality presentation of the environment may remain static during some periods of time, for example remaining static while a field-of-view of a robot varies, being updated from time-to-time (e.g., periodically) but not necessarily continuously or continually. Such may be considered a real time environment where the periods of time are sufficiently short that a human pilot is effectively able to perceive the environment and control the robot based on the perception.

One or both of the eye resembling features may take the form of an image sensor (e.g., camera) to capture images of at least a portion of an environment in which the humanoid robot operates. The image sensor(s) have a respective field-of-view, and if position in a tandem arrangement to simulate the relative positioning of human eyes, the respective field-of-view can partially overlap, and provide for depth information via the concept underlying binocular vision. The portion of the environment encompassed by the field-of-view(s) will change as a pose (i.e., position, orientation, position and orientation) of the head, torso, or even entire humanoid robot changes. Latency in communications and other possible latencies, can result in the human pilot experiencing a disorienting feeling when presented with images captured by the image sensor(s) mounted in the head of the robot 104, particularly as the pose of those image sensors changes over time. Various implementations described herein can reduce or eliminate this disorientation.

One approach, shown in at least FIG. 6, creates and provides a visual interface in the form of a presentation of a virtual environment (e.g., virtual or augmented reality environment) presented to a human wearing a virtual or augmented reality interface (e.g., head worn heads up display) where the or augmented presented representation of the environment is a virtual or augmented reality representation of the surroundings of a humanoid robot. The approach employs data feeds from one or more image sensors (e.g., digital camera(s)) of the humanoid robot, building a photogrammetric digital version or digital model of the physical environment, and causing that photogrammetric digital version or digital model of the physical environment to be presented to the human as a virtual model or virtual (e.g., virtual or augmented reality visual and/or aural presentation) representation. The approach may also employ a trained convolutional neural network to identify and extract features from the visual information. This approach allows the human to look around the photogrammetric virtual version of the physical environment independently of the position, orientation and/or movement of a head of the humanoid robot or the "eyes" of the robot. This approach advantageously allows the human to look around in real time, without a disorienting delay loop (i.e., the movement signal being sent to the humanoid robot and the camera feed being delivered back to the human). This also advantageously allows for the "eyes" of the humanoid robot to blink and saccade without affecting the user's experience.

The approach may, for example, include performing photogrammetry by a processor-based device on the output of the image sensors or "eyes" of the robot in order to map a set of pixels into a digital representation (e.g., digital file) of a three-dimensional virtual (e.g., virtual or augmented reality) representation of the imaged environment. Other information that may be used includes a pose (i.e., position and/or orientation) of the robot, the pose of a head of the robot, and/or a pose of the image sensors or "eyes" of the robot, distance measurements from laser depth sensors, images captured via lidar, sonar, etc. The processing can execute locally at the robot or remotely, for example at a human interface or at some cloud based processor-based system.

The human may, for example, be presented with the generated three-dimensional virtual (e.g., virtual or augmented or augmented reality) representation of the environment, with a current field of view of the robot indicated by a bounding box or similar graphical effect presented in tandem (e.g., overlaid) with the three-dimensional virtual (e.g., virtual or augmented or augmented reality) representation of the imaged environment. The human can then look around, independently of the current field of view of the robot, and see the previously generated three-dimensional virtual (e.g., virtual or augmented or augmented reality) representation of the imaged environment.

As new information is captured or received, the three-dimensional virtual representation of the imaged environment is updated based on the new information. Typically, most of the environment is static, so the updated information will mostly represent movements of objects, humans, and/or other animals.

Another approach, shown in at least FIG. 17, creates and provides a virtual environment to a processor-based system, where the virtual environment is, for example, a virtual or augmented reality representation of the surroundings (i.e., real world physical environment) of a robot. The processor uses that virtual environment to predict movements of objects in the real world physical environment, and can also use the virtual environment to create a movement set that will achieve a given goal and test the movement in the virtual environment before applying the movement set in the real world physical environment.

The method may, for example, include performing photogrammetry on the output of the image sensors of the robot in order to map a set of pixels onto a three-dimensional virtual (e.g., virtual or augmented reality) representation of the imaged environment. Other information that may be used includes a pose (i.e., position and/or orientation) of the robot, a pose of a head of the robot, and/or a pose of the image sensors or "eyes" of the robot, distance measurements from laser depth sensors, images captured by lidar, sonar, etc. The processing can execute locally at the robot or remotely, for example at a human interface or at some cloud based processor-based system. The approach may also employ a trained convolutional neural network to identify and extract features from the visual information.

A processor-based system may then extract objects from the three-dimensional virtual (e.g., virtual or augmented reality) representation. The three-dimensional virtual representation may then be processed by a physics engine where the processor-based system can predict the movements of objects, humans and/or other animals by extrapolating from the physical values of the objects, humans and/or other animals. The processor-based system may also include a virtual representation of the robot in the environment. The processor-based system may then use the virtual environment to create a movement set that achieves a specified or defined physical goal, such as moving a ball or picking up a specific object. The creation of the movement set may be done by creating many random movement sets and applying those movements to the virtual environment and choosing the set that successfully achieves the specified or defined goal in the virtual environment. The chosen or selected movement set may then be applied to the real robot. This can be done iteratively, where after one small movement is completed, the processor-based system recalculates the movement sets to account for unexpected factors such as a change in environment or an inaccuracy in the movement.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
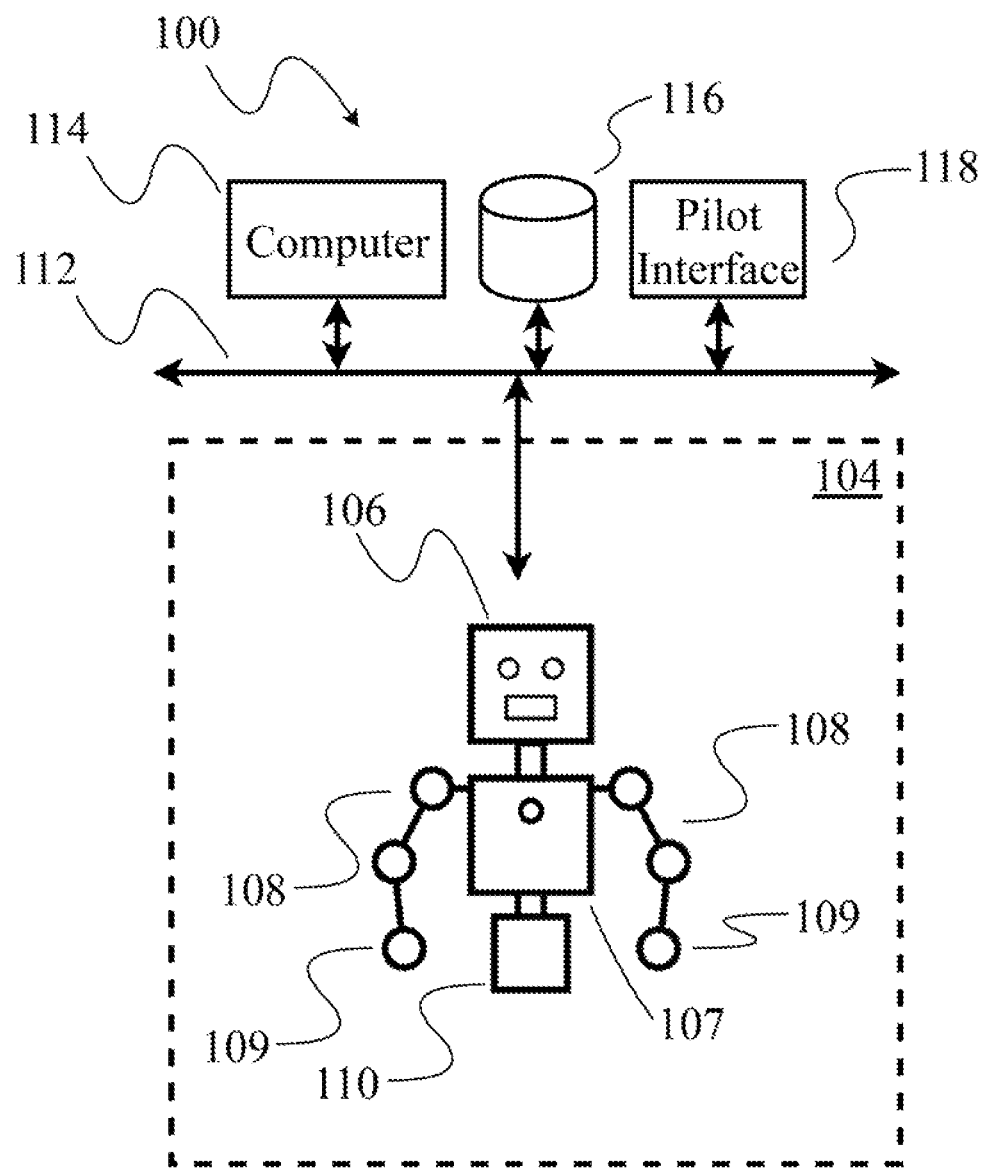
FIG. 1 is a schematic diagram showing a robot, a human pilot, and a processor-based computer system that provides a virtual (e.g., virtual or augmented reality) representation to the human pilot of at least a portion of an environment in which the robot operates, according to at least one illustrated implementation.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, certain structures associated with robots, servers, communications networks or other communications channels, and various sensors or transducers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or to "one embodiment" or "an embodiment" means that a particular feature, structure or characteristic described in connection with the embodiment is included in at least one implementation or embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings provided herein are for convenience only and do not interpret the scope or meaning of the various implementations or embodiments.

"VR" as used throughout this specification is short for "virtual reality". Virtual reality, as used herein, refers to a set of processor generated sensory information, including audio information, visual information, haptic feedback, etc. that virtually represent the experience of being in an environment digitally stored and generated via a processor based system. The sensory information may be delivered to a human user in order to simulate the sensory information that the human user would experience in the virtual environment. Virtual reality technology may enable the user to move within the environment, interact with objects within the environment, etc., through sensing the movements of the limbs and appendages of the user, or through direct commands from the user.

"AR" as used throughout this specification is short for "augmented reality". Augmented reality, as used herein, refers to a set of processor generated sensory information, including audio information, visual information, haptic feedback, etc. that augments the experience of being in real world environment with augmented content generated via a processor based system. Augmented reality technology may enable the user to move within the environment, interact with objects within the environment, etc., with the visual and/or aural presentation of augmented content that does not actually appear in the environment.

FIG. 1 shows robot 104, a human pilot at an interface 118 (also denominated herein as I/O interface, human interface device or system), and a processor-based computer system 114 that provides a digital representation or model of at least a portion of a three-dimensional environment in which the robot operates for presentation to the human pilot as a virtual or virtual reality representation, according to at least one illustrated implementation, and which can perform various acts described herein. As such, FIG. 1 illustrates an example of a system 100 which can execute various methods described herein.

The robot 104 may, for example, take the form of a humanoid robot 104.

The humanoid robot 104 can have various implementations or forms, and resembles at least a portion of a human, for example including a humanoid head 106. In some implementations, humanoid head 106 includes features that resemble a pair of eyes, features that resemble a mouth, and optionally other human-like features. Humanoid head 106 is optionally coupled to a torso 107. In some implementations, one or more robotic appendages or actuated arms (e.g., arms 108) are movably coupled to the torso 107. Each of arms 108 includes at least two links, coupled by one or more joints. The joints included in arms 108 may be actuated or passive and may couple the included links in series. Each of the arms 108 may include a respective end-effector 109, e.g., distally disposed end-effector. In the illustrated implementation, the humanoid robot 104 includes a base 110 coupled to torso 107. In other implementations, the humanoid robot 104 may include one or more leg appendages that resemble human legs (e.g., humanoid legs), wheels, treads, etc. Further details of and alternatives to humanoid robot 104 are further described with reference to FIG. 2.

One or both of the eye resembling features may take the form of an image sensor (e.g., camera) to capture images of at least a portion of an environment in which the humanoid robot 104 operates. The image sensor(s) have a respective field-of-view, and if position in a tandem arrangement to simulate the relative positioning of human eyes, the respective field-of-view can partially overlap, and provide for depth information via the concept underlying binocular vision. The portion of the environment encompassed by the field-of-view(s) will change as a pose (i.e., position, orientation, position and orientation) of the head, torso, or even entire humanoid robot 104 changes.

Referring to the example system 100 in FIG. 1, the humanoid robot 104 is communicatively coupled through a wired and/or wireless communications channel to a network 112. The network 112 communicatively couples humanoid robot 104 with one or more other processor-based systems, e.g., computer 114; with network accessible tangible storage device 116; and/or with a human operator or pilot at an interface 118. Network 112 may also communicatively couple the humanoid robot 104 via the Internet, or an intranet or extranet. Computer 114 may include one or more processors, for example one or more microprocessors, central processing units (CPUs), graphics processing units (GPUs), digital signal processors (DSPs), field programmable gate arrays (FPGAs), programmable logic controllers (PLCs), operable to execute instructions or logic to carry one the methods or portions thereof described herein. Computer 114 or storage device 116 may include one or more non-transitory processor-readable storage media that stores processor-executable instructions, logic and/or data, for example one or more volatile memories (e.g., random access memory (RAM), registers); nonvolatile memory (e.g., read only memory (ROM), Flash memory, electronically erasable programmable read only memory (EEPROM), solid state drive (SSD)); or spinning media storage (e.g., magnetic disk, optical disk) with associated drive (e.g., hard disk drive, optical disk drive, tape storage). Processor-executable instructions, logic and/or data may be stored as software (e.g., executable object code), firmware or other forms. Processor-executable instructions may implement methods described herein at, at least, FIG. 6. Computer 114 may include one or more buses or other communications channel communicatively coupling the processor(s) and storage media.

FIG. 1 illustrates an example of a system which can execute various methods described herein. The humanoid robot 104 can be controlled by the human pilot (also referred to as human operator) at an interface 118. The human pilot at an interface 118 can observe the environment through a set of transducers including audio, visual, and other transducers (e.g., display screens, speakers).

The processor-based computer system 114 will typically have a relatively lower latency and/or relatively high bandwidth communications channel with a robot or cameras as compared to relatively higher latency and/or relatively low bandwidth communications channel of the interface 118. The processor-based computer system 114 may, for example, be co-located with the humanoid robot 104. Alternatively, one or more processors that are part of robot 104 may execute various methods described herein.

As noted above, the portion of the environment encompassed by the field-of-view(s) will change as a pose of the head, torso, or even entire humanoid robot 104 changes. Latency in communications and other possible latencies, can result in the human pilot experiencing a disorienting feeling when presented with images captured by the image sensor(s) mounted in the head of the robot 104, particularly as the pose of those image sensors changes over time. Various implementations described herein can reduce or eliminate this disorientation.

Figure 2:
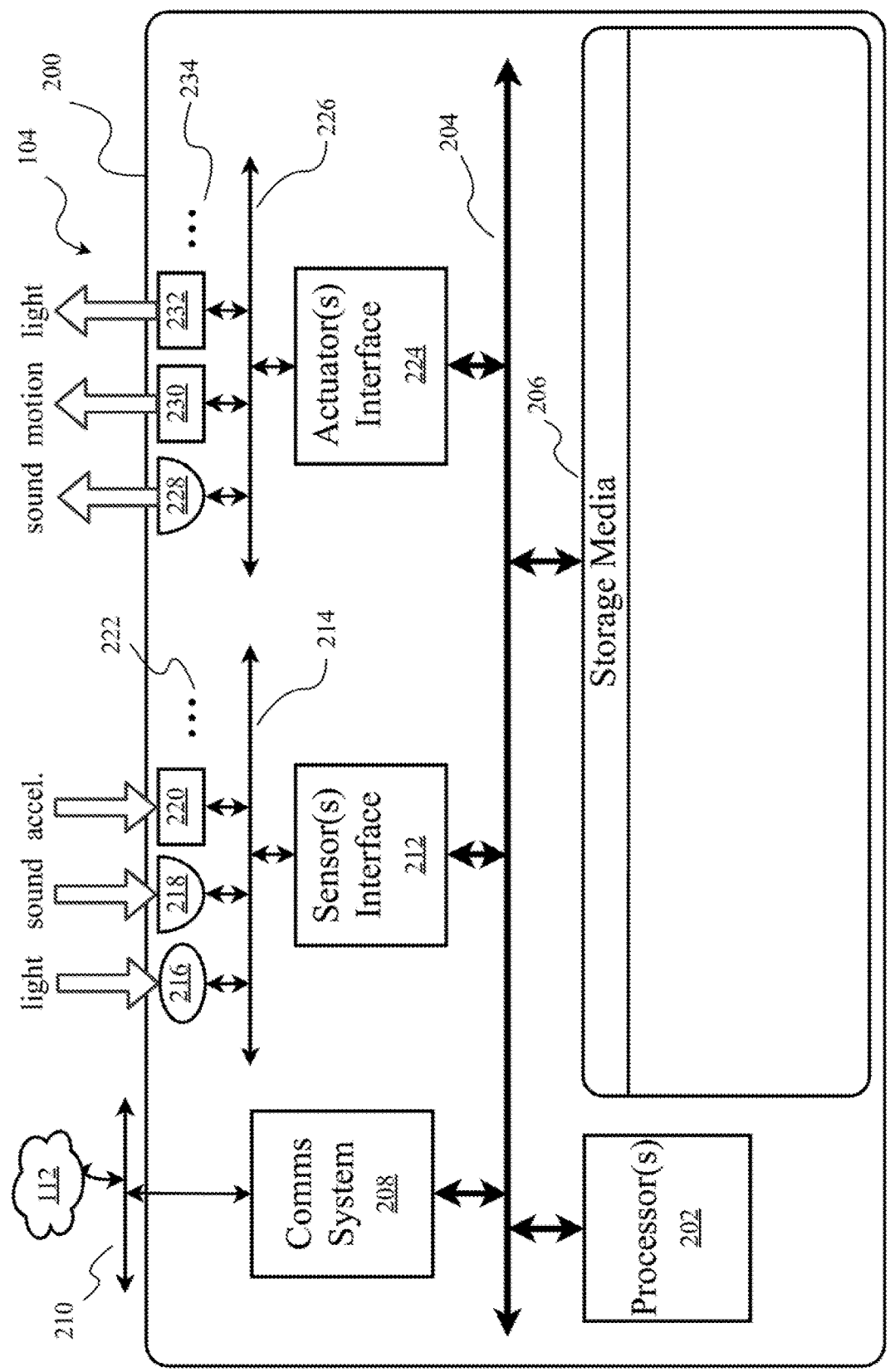
FIG. 2 is a schematic diagram of a processor-based robot according to at least one illustrated implementation.

FIG. 2 schematically illustrates a robot 200 which may be used as humanoid robot 104 (FIG. 1). One more components in robot 200 may be included in, or comprise, humanoid robot 104, and may be used in execution of implementations of one or more methods described herein. Many of the components illustrated or described herein can be broken up into parts, combined into other structures, or replaced by other components.

Robot 200 includes a processing subsystem including one or more digital processors 202 and associated circuitry. Digital processors 202 include circuitry and may be any logic processing unit, such as one or more microprocessors, central processing units (CPUs), digital signal processors (DSPs), graphics processing units (GPUs), application-specific integrated circuits (ASICs), programmable gate arrays (PGAs), and programmed logic controller (PLCs).

The processor(s) 202 is(are) coupled to a data bus 204 allowing interaction between the various components of robot 200. The data bus 204 can be implemented using a variety of wired or wireless structures and associated data exchange protocols, such as USB, PCIe, SATA, NVMe, and I2C. The data bus 204 couples processor(s) 202 to a one or more non transitory digital storage devices 206 which may include a combination of hard disk drives, solid state drives, flash storage devices, tape storage, random access memory (RAM), read only memory (ROM), registers, or other digital data storage systems. The digital storage device(s) 206 stores, at least, data storage, one or more sets of processor-executable instructions that may be executed by processor(s) 202, interface drivers for the other systems. The data bus 204 is communicatively coupled to a communication system or controller 208 which allows access and control of a communication bus 210. Bus or communications port (e.g., wired port, wireless port or radio, optical fiber port) 210 communicatively couples one or more components of system 200 to a network like network 112, other wired or wireless structures, and employs interface protocols which allow system 200 to perform digital data interaction with other devices.

Sensor(s) interface 212 is communicatively coupled to data bus 204 and a sensor bus 214. One or more sensors may be coupled to sensor bus 214 such as one or more image sensors 216 (e.g., digital camera, Videocon, photodiodes), one or more microphones 218, one or more acceleration sensors (single axis or multi-axis accelerometers, inertial sensors) 220, magnetic sensors, or other sensors 222. Various sensors may be located in a portion of the humanoid robot 104. For example, cameras may be positioned at or proximate the eyes, speakers positioned at or proximate the mouth, microphones positioned at or proximate the ears.

Actuator(s) interface 224 communicatively couples data bus 204 and actuator bus 226. One or more components in system 200 may interact with one or more actuators by actuator(s) interface 224. System 200 can include a variety of different types of Actuator(s) interfaces 224, for example motor controllers or microcontrollers operable to control electric motors, solenoids, electromechanical relays, valves, etc. System 200 can include a variety of different types of actuators such as one or more speakers 228, one or more force actuators 230 (e.g., electric motor, stepper motor, solenoid, pneumatic piston with piston head, piston cylinder, valves and reservoir of pressurized fluid (e.g. gas), hydraulic piston with piston head, piston cylinder, valves and reservoir of pressurized fluid (e.g. relatively incompressible liquid), magnets, haptic engines), one or more light emitting devices (such as liquid crystal display screens (LCDs), light emitting diodes (LEDs) or LED screens, etc.) 232, or other actuators 234. Various actuators may be located in a portion of the humanoid robot 104. For example, motors, solenoids or pistons can be located at or proximate joints or linkages of various appendages.

Figure 3:
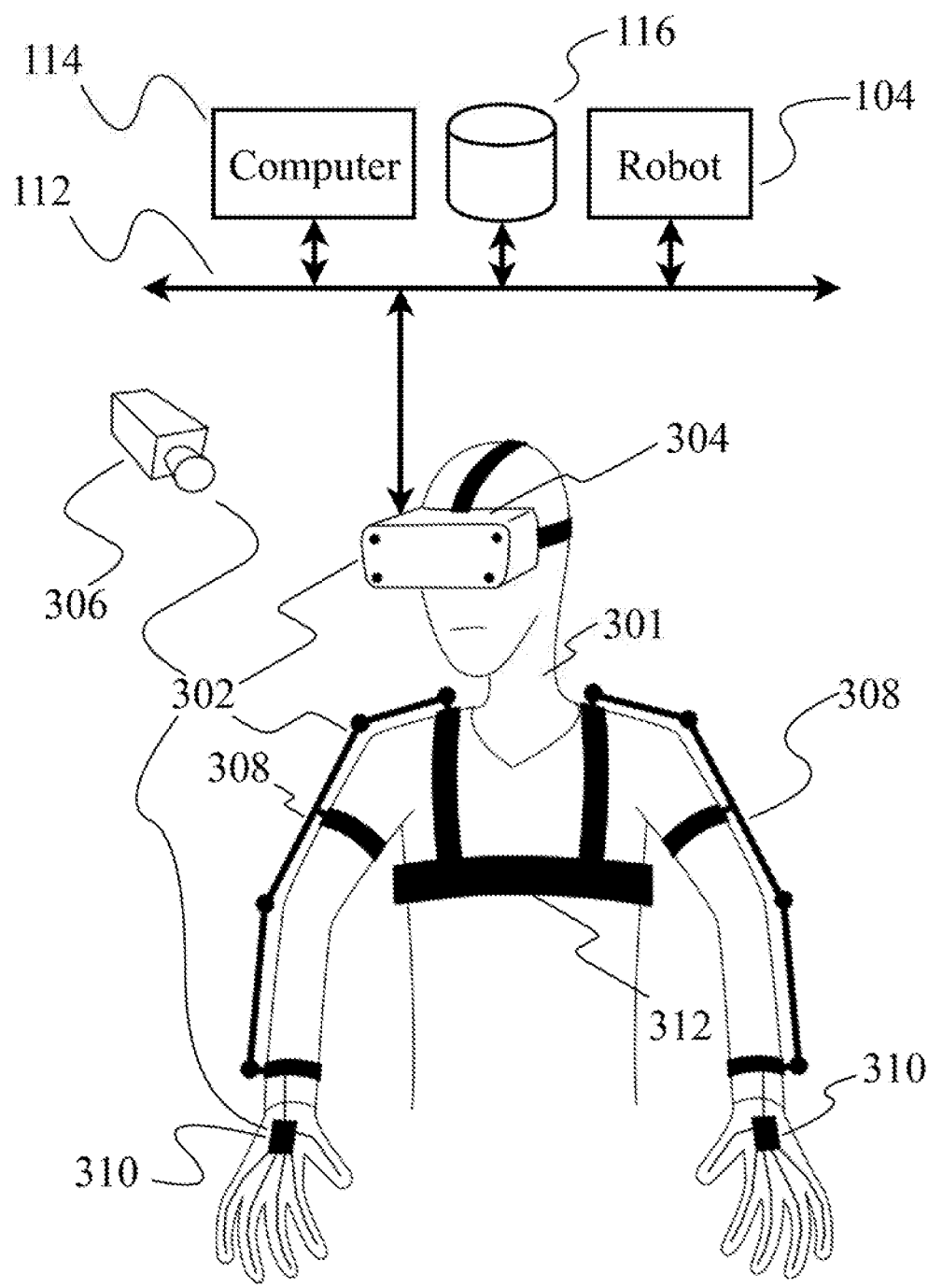
FIG. 3 is a schematic diagram showing a robot, a human pilot wearing a heads up display device and a limb tracking system, and a processor-based computer system that provides an interface to the human pilot which virtually represents at least an environment in which the robot operates, according to at least one illustrated implementation.

FIG. 3 shows a robot 104, a human pilot 301, an input/output (I/O) interface (e.g., a heads up display 304, camera 306, limb tracking system 308, digit tracking systems 310) 302, and a processor-based computer system 114 that provides a digital representation or model of at least a portion of a three-dimensional environment in which the robot operates for presentation to the human pilot as a virtual or virtual reality representation, according to at least one illustrated implementation, and which can perform various acts described herein.

The I/O interface 302 may, for example, include a heads up display 304, with or without speakers, to be worn by a human pilot 301. The heads up display 304 may be operable to visually present a virtual representation of an environment to the human pilot 301, for instance as a virtual reality or augmented reality representation.

The I/O interface 302 can have a variety of implementations and forms which can perform the various acts described herein. The I/O interface 302 may have one or more components that are worn by the human pilot 301, and one or more components that are located proximate to but are not worn by the human pilot 301. For example, the I/O interface 302 may comprise a VR head-mounted or head-worn heads up display 304, with or without speakers, to be worn by a human pilot 301. Also for example, the I/O interface 302 may include one or more limb position tracking systems 308, and/or or one or more digit tracking systems 310, to be worn by a human pilot 301. Some or all of these systems may be attached to the human pilot 301 via a body attachment system 312, for example belts, suspenders, vests, harnesses, buckles, snaps, hook and loop fastener, and the like. Also for example, the I/O interface 302 may include one or more image sensors (e.g., digital cameras) 306 which may be at least proximate the human pilot 301. One or more of the image sensors (e.g., digital cameras) 306 may be worn by the human pilot 301.

Referring to the example system 300 in FIG. 3, the I/O interface 302 is communicatively coupled through a wired and/or wireless communications channel to the network 112. The network 112 communicatively couples the VR apparatus 302 with other processor-based systems for example computers 114, with network accessible storage media 116, and/or with the humanoid robot 104.

FIG. 3 illustrates an example of a system which can execute various methods described herein. The portions of the I/O interface 302 can be worn by a human pilot at an interface 118. The human pilot at an interface 118 to control the humanoid robot 104 and observe the environment in which the humanoid robot 104 operates via the I/O interface 302 (e.g., via one or more display screens, speakers, or other transducers, and/or sensors).

Figure 4:
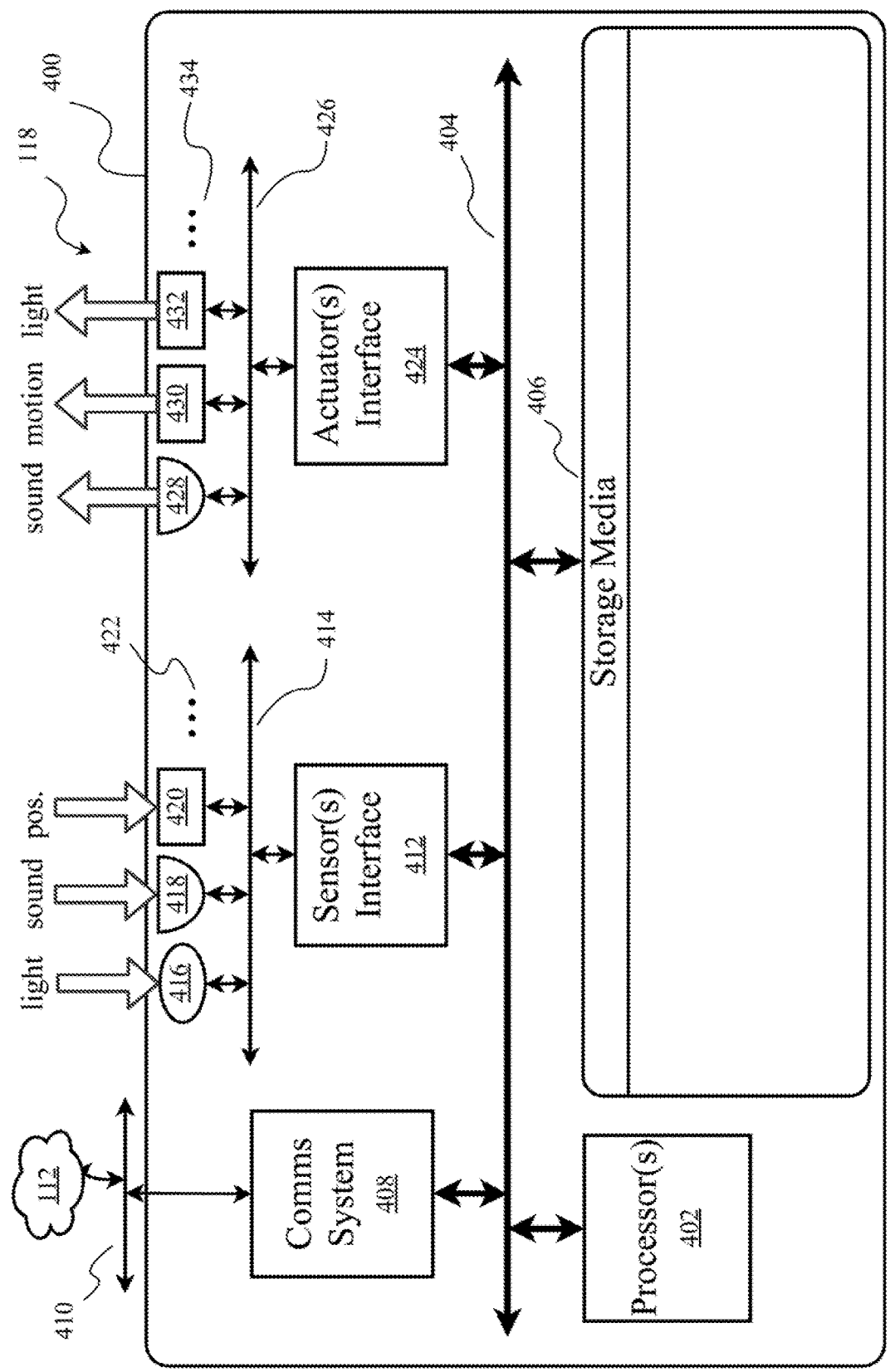
FIG. 4 is a schematic view of a processor-based human interface system according to at least one illustrated implementation.

FIG. 4 schematically illustrates an interface system 400 which may be used as the IO interface 302 (FIG. 3). The I/O interface system 400 acts as an interface with the human pilot 301, thus is denominated as a human interface system 400. One more components of the human interface system 400 may be included in the I/O interface 302 (FIG. 3), and may be used in execution of implementations of one or more methods described herein. Many of the components illustrated or described herein can be broken up into parts, combined into other structures, or replaced by other components.

Human interface system 400 includes a processing subsystem including one or more digital processors 402 and associated circuitry. Digital processors 402 include circuitry and may be any logic processing unit, such as one or more of a microprocessor, central processing unit (CPU), digital signal processor (DSP), graphics processing unit (GPU), application-specific integrated circuits (ASIC), programmable gate arrays (PGA), and programmed logic controller (PLC).

The processor(s) 402 is(are) coupled to a data bus 404 allowing interaction between the various components of human interface system 400. The data bus 404 can be implemented using a variety of wired or wireless structures and associated data exchange protocols, such as USB, PCIe, SATA, NVMe, and I2C. The data bus 404 couples processor(s) 402 to a one or more digital storage devices 406 which may include a combination of hard disk drives, solid state drives, flash storage devices, tape storage, random access memory (RAM), read only memory (ROM), registers, or other digital data storage systems. The digital storage device 406 houses, at least, data storage, one or more sets of processor-executable instructions that may be executed by processor(s) 402, interface drivers for the other systems. The data bus 404 is coupled to a communication system or controller 408 which allows access and control of a communication bus 410. Bus or communications port (e.g., wired port, wireless port or radio, optical fiber port) 410 communicatively couples one or more components of system 400 to a network like network 112, other wired or wireless structures, and employs interface protocols which allow system 400 to perform digital data interaction with other devices.

Sensor(s) interface 412 is communicatively coupled to data bus 404 and a sensor bus 414. One or more sensors may be coupled to sensor bus 414 such as one or more image sensors 416 (e.g., digital camera, Videocon, photodiodes), one or more microphones 418, one or more angle or position sensors 420 (encoders, IMUs, etc.), magnetic sensors, or other sensors 422. Various sensors may be located in a portion of the I/O interface 302. For example, cameras may be positioned in the vicinity of the VR apparatus in order to track the position of different parts of the apparatus, microphones may be positioned near the operator's mouth, distance sensors may be positioned throughout the apparatus to detect proximity to nearby objects, acceleration and gyroscope sensors may be positioned throughout the limbs and around the head to detect movements, etc.

System 400 can include one or more actuator(s) interfaces 424 which communicatively couples data bus 404 and actuator bus 426. One or more components in system 400 may interact with one or more actuators by actuator(s) interface(s) 424. Actuator(s) interfaces 424 may be of a variety of types, such as, for video screens, LEDs, speaker systems, or haptic feedback. System 400 can include a variety of different types of actuators such as one or more speakers 428, one or more force actuators 430 (e.g., electric motor, haptic engines), one or more light emitting devices (such as liquid crystal display screens (LCDs), light emitting diodes (LEDs) or LED screens, etc.) 432, or other actuators 434. Various actuators may be located in a portion of the I/O interface 302. For example, one or more LCDs may be located in the head mounted portion of the apparatus, one or more speakers may be mounted near the operator's ears, etc.

Figure 5:
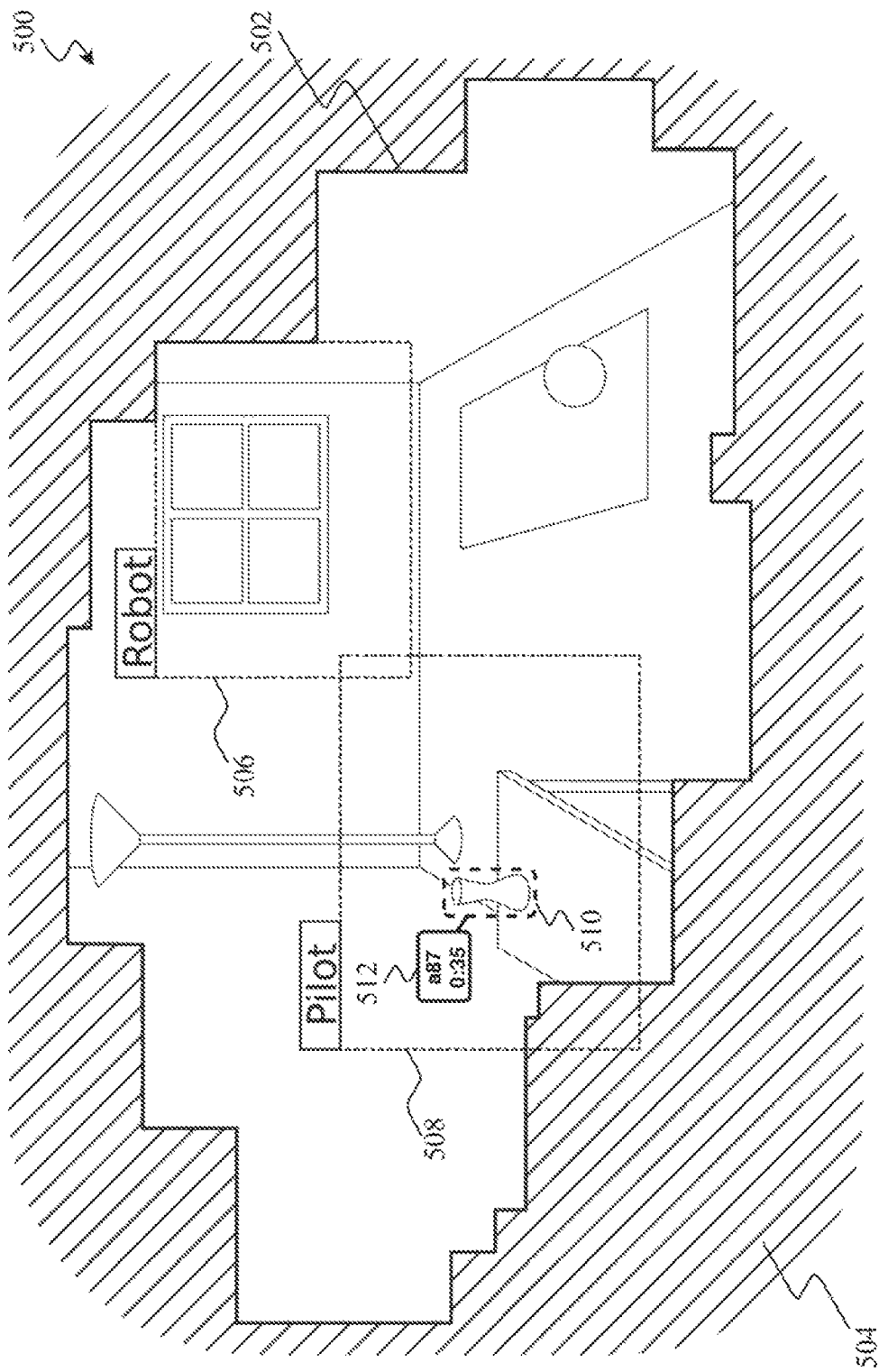
FIG. 5 is an isometric view of an three-dimensional mapping of an environment in which a robot operates generated via a processor-based system according to at least one illustrated implementation, the three-dimensional mapping may be stored or converted into and stored as a digital representation in non-transitory computer- or processor-readable media.

FIG. 5 illustrates an example of at least a portion of an environment in which a robot operates which is stored as a three-dimensional mapping 502. The three-dimensional mapping 502 may be generated via a processor-based system on execution of one or more of the methods described herein, and is typically stored in digital form, but represents at least a portion of a virtual environment 504, for example as depicted in FIG. 5, that is presentable to a human pilot as a virtual representation (e.g., virtual reality or augmented reality) representation via an I/O interface. The three-dimensional mapping 502 is continuously updated or added to.

Parts of the virtual environment 504 that have not been mapped, and are thus not part of the three-dimensional mapping 502, are left blank. The virtual environment 504 is a three dimensional virtual environment that a human operator at an interface 118 may be able to explore through I/O interface 302. The three-dimensional mapping 502 may be created through analysis of one or more humanoid robot's camera views 506 as the humanoid robot's camera views 506 observe different parts of the humanoid robot's surroundings. The humanoid robot's camera views 506 may move due to automated procedures, through control by the human operator at an interface 118 or some combination of the two. The human operator at an interface 118 may use the I/O interface 302 to observe the virtual environment 504, which may include perceiving some combination of blank, unexplored parts of the virtual environment 504, parts of the environment map, and the real time or delayed feed from the humanoid robot's camera views 506. The human operator view 508 may be a different size that the size of the humanoid robot's camera views 506 and may include other information such as the location of the humanoid robot's camera views 506.

In at least some implementations, at each of a number of successive times, a first processor-based device that is co-located or that has a relatively low latency and/or relatively high bandwidth connection with sensors (e.g., cameras) of the humanoid robot generates a new temporary map of the portion of the environment currently being sensed (e.g., viewed) by the sensors. The first processor-based device compares the new temporary map with the full map, and extracts updates which represent changes between the mappings from two instances of time. The first processor-based device implements these updates locally on the full map, and also provides the updates to a second processor-based device (e.g., I/O interface 302) co-located with the human pilot, via a relatively higher latency and/or relatively lower bandwidth connection. (The connection between the first and the second processor-based devices is relatively higher latency and/or relatively lower bandwidth as compared to the connection between the first processor-based device and the sensors, although may not be high latency or low bandwidth in absolute terms.) The second processor-based device updates a local instance of the full the map, for example a local instance of the full map that is stored at the I/O interface 302.

In some implementations, the first processor-based device may build the full map over an extended period of time, for example mapping different portions of the environment as those portions come within a field-of-view of the sensors of the humanoid robot as the humanoid robot performs various tasks (i.e., tasks that are not dedicated to mapping the environment). In some implementations, the first processor-based device may build the full map over a short period of time during an initialization, for example mapping each portion of the environment as those portions come within a field-of-view of the sensors of the humanoid robot as the humanoid robot is moved through a full range of motions during the initialization (i.e., tasks that are dedicated to mapping the environment).

In certain implementations, the three-dimensional mapping 502 or sections thereof may comprise information regarding when that section was updated last or information regarding the likelihood of different elements being present where they were last scene. The information may be generated through the use of information regarding autonomy of the elements, the presence of elements that may move other elements (e.g. a dog near a ball), or effects of physics on objects (e.g. a ball on a sloped surface).

In this implementation, when the human operator view 508 is focused on an element of interest 510, the three-dimensional mapping 502 provides a virtual tag 512 connected to the element. The virtual tag 512 may identify the element with a unique identification number, and may indicate the elapsed duration since the presence of the element was last confirmed. Other information that may be indicated include what the element is, physical values relating to the element, such as material, volume, mass, center of gravity, etc., or the ownership of the element.

In different implementations of the described methods, the three-dimensional mapping 502 may be a three-dimensional point-cloud, polygonal, NURBS surfaces, CAD models, voxel, Bézier surfaces or similar representation of the environment.

Figure 6:
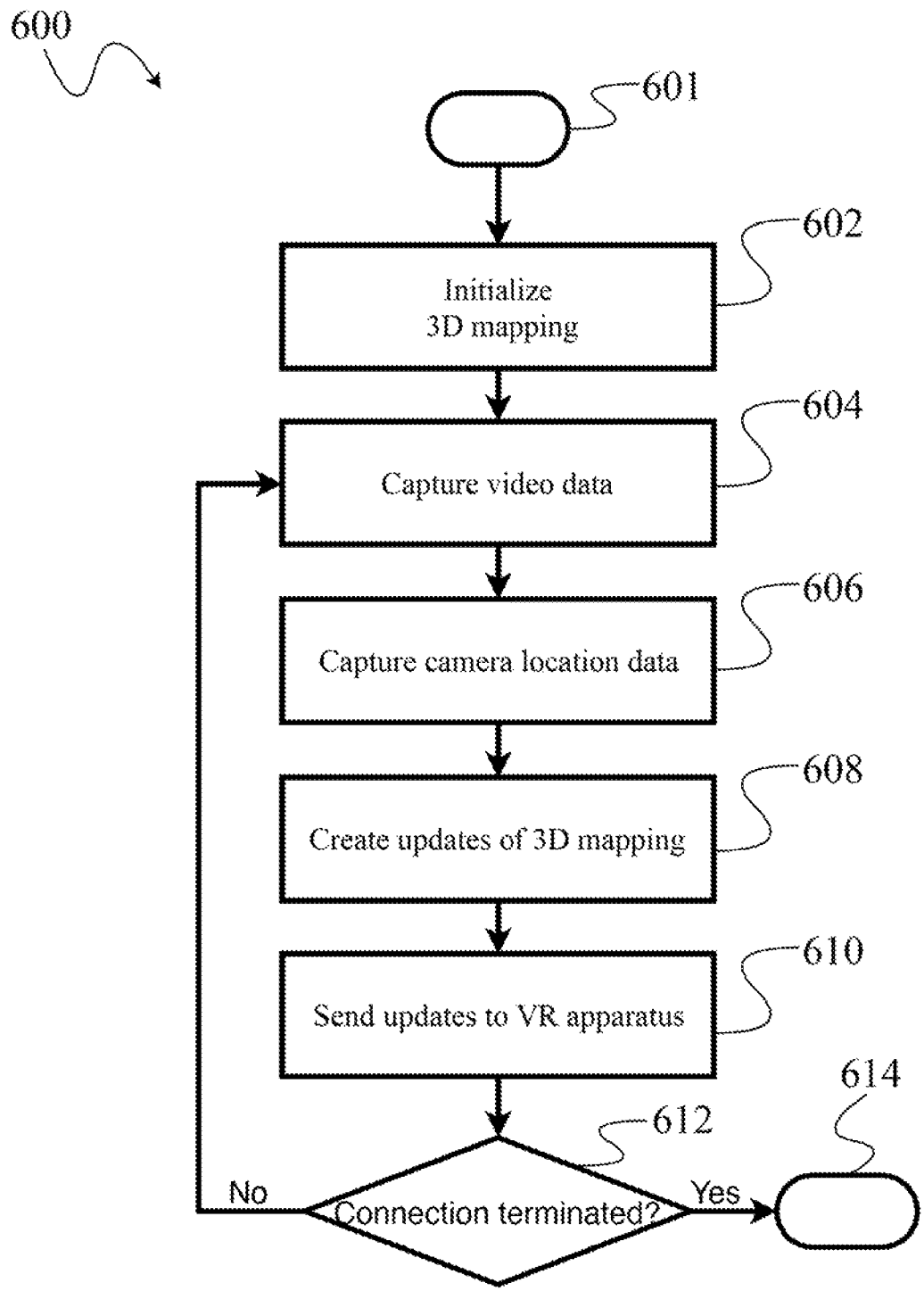
FIG. 6 is a flow diagram showing a high level method of operation in a processor-based system according to at least one illustrated implementation.

FIG. 6 shows a high level method of operation of a processor-based system to generate a three-dimensional digital representation or model of at least a portion of an environment in which a humanoid robot operates, and which employs an I/O interface 302 (FIG. 3) to provide a virtual representation (e.g., virtual reality representation; augmented reality representation) of that portion of the environment to a human pilot to allow the human pilot to at least partially control operation of the humanoid robot from a distance, according to at least one illustrated implementation. The processor-based system may be part of the humanoid robot 104, may be co-located with the humanoid robot 104, and/or coupled to the humanoid robot 104 via a relatively low latency (e.g., high bandwidth) communications channel that is substantially lower latency than a communications channel (e.g., the Internet) that communicatively couples the processor-based system to an I/O interface co-located with a human pilot.

The method 600, and other methods described herein, may be varied to include other acts, omit acts, and/or vary acts, or perform acts in a different order to accommodate alternative implementations. The method 600 is described as being performed by a processor-based system, for example, processor(s) in processing subsystem 202, in conjunction with other components, such as those found in system 100, robot 200, or the human interface system 400. The processor-based system in this and other methods is referred to as singular but may be performed by multiple processor-based systems. In method 600 and other methods a processor-based system may be described as performing an act and this includes performing the act or causing the act to be performed. The processor-based system performs the method 600 in response to executing processor-executable instructions or other logic.

At 601, the method 600 starts. For example, the method 600 may start in response to a startup of the system, a user input, a new frame generated by an imaging device, a call or invocation from a calling routine or program.

At 602, the processor-based system initializes one or more components. As part of the initialization, the processor-based system may receive information (e.g., images captured via one or more sensors of a humanoid robot) and may create an initial three-dimensional mapping of at least a portion of an environment in which the humanoid robot operates. As described above, the processor-based system may build the initial mapping representing the entire environment as part of the initialization, or may build the initial mapping of only a portion of the environment during initialization, extending the mapping to encompass other portions of the environment over an extended period of time as the humanoid robot performs various non-mapping dedicated tasks.

At 604, the processor-based system receives or samples or captures images (e.g., video, image) and/or or other environmental sensory data (audio, speed, velocity, acceleration) captured or sensed by one or more sensors during performance of various tasks by the humanoid robot.

At 606, the processor-based system captures or otherwise determines a pose (e.g., the location and/or orientation) of some or all of the sensors (e.g., "eyes" of humanoid robot), limbs, head, body, etc. of the humanoid robot 104. This may be accomplished via the use of various sensors, for example rotational encoders, positions of stepper motors, Reed switches, or other positional sensors.

At 608, the processor-based system compares a mapping of at least a portion of the environment that represents the portion of the environment at a second time to a mapping of at least the portion of the environment that represents the portion of the environment at a first time, to determine or identify the differences in the portion of the environment, if any, that occurred between the two instances of time, and the processor-based system generates a set of updates to the three-dimensional map or digital representation of a portion of the environment in the captured images that represents those differences based on the comparison or identification of differences. At 610, the processor-based system sends the set of updates regarding changes to the environment map to the I/O interface 302. Notably, the updates may advantageously be limited to representing only changes, thus eliminating any need to send and entire mapping each time following the initial mapping. Thus, the lack of a relatively low latency and/or relatively high bandwidth communications channel between the humanoid robot and the I/O interface can be overcome.

At 612, the processor-based system checks the status of the couplings between the robot and the network 112. If the coupling is active, the method 600 may continuously or periodically repeat from 604 while the system is operational. The method 600 may terminate at 614 until invoked again.

Figure 7:
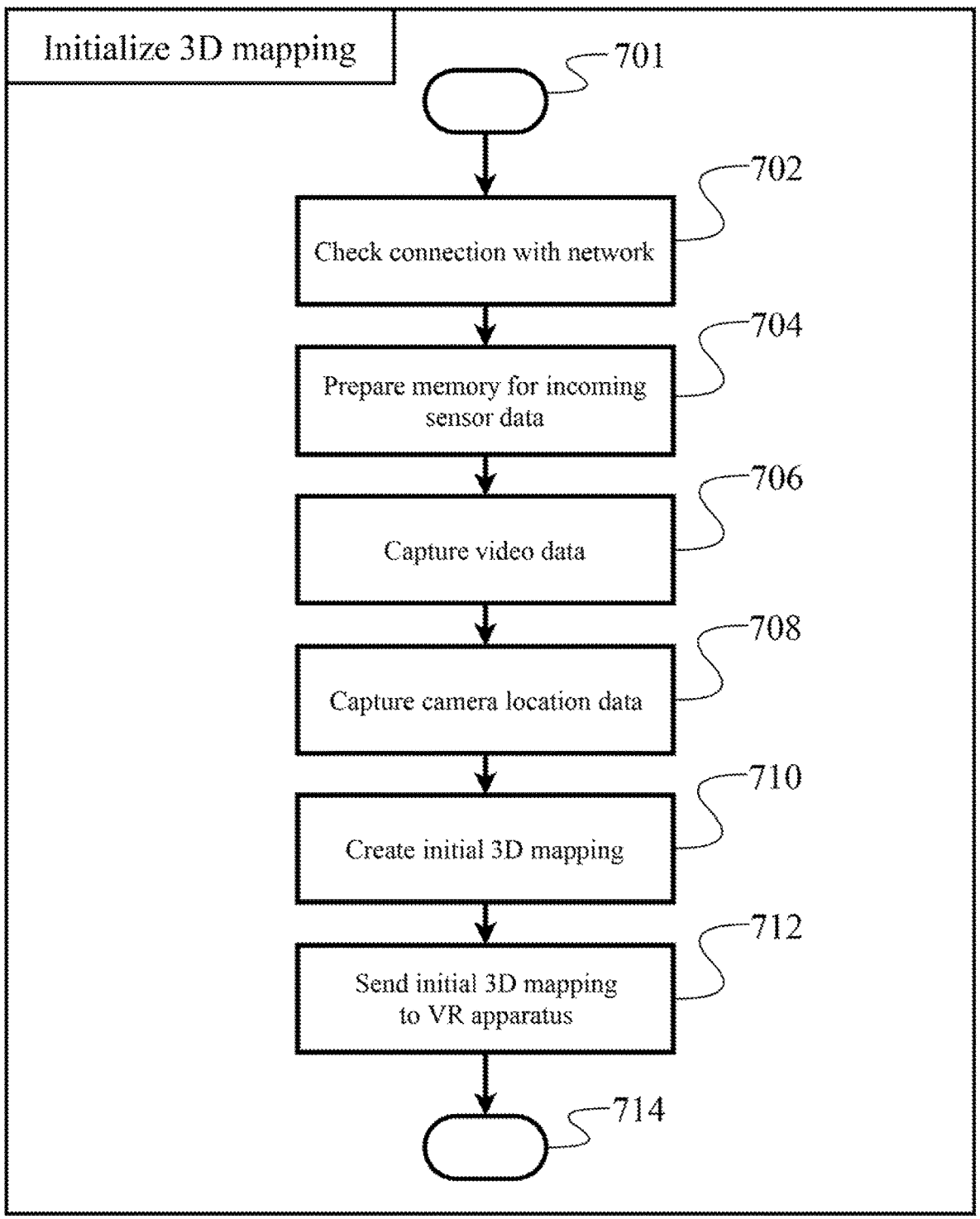
FIG. 7 is a flow diagram showing a low level method of operation in a processor-based system according to at least one illustrated implementation, the method which can be employed in performing an initialization of the method of FIG. 6.

FIG. 7 shows an initialization method 700, according to at least one illustrated implementation. A processor-based system may perform the initialization method 700 to initialize one or more components of the processor-based system and/or the humanoid robot 104 and to create the first three-dimensional mapping of the environment. The processor-based system may be the humanoid robot 104 itself, part of the humanoid robot 104, separate and distinct from but co-located with the humanoid robot 104, and/or communicatively coupled to the humanoid robot 104 via a low latency communications channel. The initialization method 700 may be performed as part of executing the method 600 (FIG. 6).

Initialization method 700, in part, prepares the processor based system or humanoid robot 104 for the environment mapping and updating procedure and creates the initial three-dimensional mapping. Method 700 may implement all or a portion of the initialization operation 602 of method 600 (FIG. 6). Various acts of method 700 are optional, and may be performed in a different order than presented.

Initialization method 700 starts at 701. For example, the initialization method 700 may start in response to a startup of the system, a user input, a call or invocation from a calling routine or program, or completion of a previous environment mapping cycle.

At 702, the processor-based system checks for a communicative coupling to the network 112. If a communicative coupling does not exist, then the processor-based system attempts to establish a communicative coupling. The communicative coupling is to ensure that any updates to any sets of instructions can be retrieved from the network and any environment data collected can be shared to the network. The communicative coupling may also be used to retrieve queries, or receive overriding instructions. The communicative coupling may also be used to receive information regarding the motions and controls sent by the user.

At 704, the processor-based system checks the availability of sufficient digital storage space in the digital storage device 206 to accommodate the expected incoming data which may include image data and location and orientation information.

At 706, the processor-based system captures video, image, or other environmental sensory data from one or more sensors. At 708 the processor-based system capture the location or orientation of some or all of the eyes, limbs, head, body, etc. of the humanoid robot 104, this may be done through the use of rotational encoders, motor positions, or other positional sensors. At 710 the processor-based system executes one or more photogrammetry routines to generate a three-dimensional mapping of at least a portion of the environment represented in the images captured at 706. The photogrammetry routine(s) may also use the location data captured in at 708, image and location data captured in earlier applications of the method 600, or an artificial intelligence routine that identifies objects in the provided image data.

At 712, the processor-based system sends the information encoding the initial three-dimensional mapping to one or more components of the I/O interface 302 worn by the human pilot at an interface 118.

The initialization method 700 may terminate at 714, until invoke again.

Figure 8:
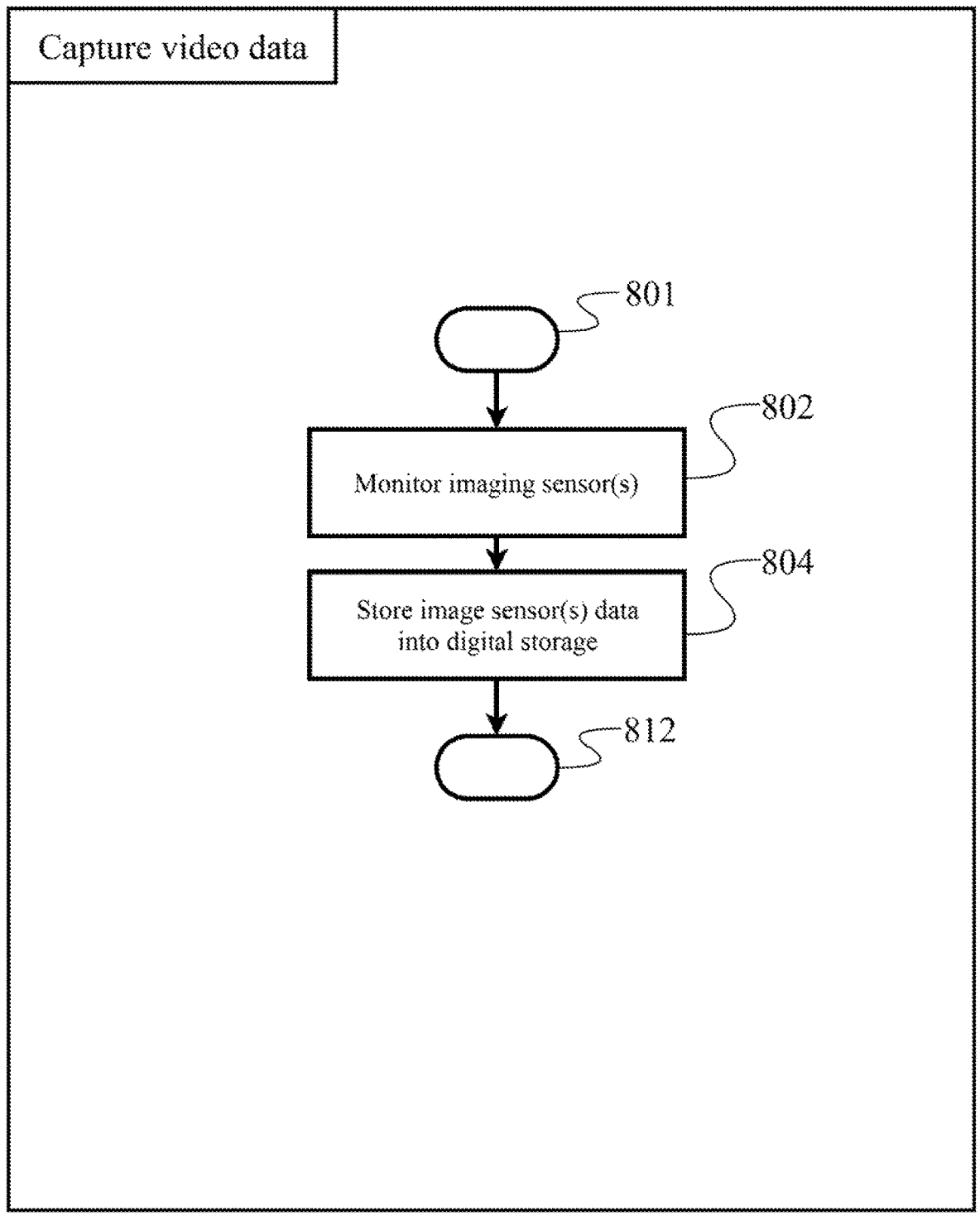
FIG. 8 is a flow diagram showing a low level method of operation in a processor-based system according to at least one illustrated implementation, the method which can be employed in performing an image capture of the method of FIG. 6.

FIG. 8 shows a method to capture video data 800, according to at least one illustrated implementation. A processor-based system may perform the method to capture video data 800 when the processor-based system is receiving imaging information from image sensor component(s) of a humanoid robot 104. The method to capture video data 800 may be performed as part of executing the method 600 (FIG. 6) or the method 700 (FIG. 7).

The method for to capture video data 800, in part, prepares the processor based system or humanoid robot 104 for the environment mapping and updating procedure. Method 800 may implement all or a portion of capturing video data operation 604 of method 600 (FIG. 6) or capturing video data operation 706 method 700 (FIG. 7). Various acts of method 800 are optional, and may be performed in a different order than presented.

The method to capture video data 800 starts at 801. For example, the method to capture video data 800 may start in response to a call or invocation from a calling routine or program.

At 802, the processor-based system monitors the data output of the one or more imaging sensors 216.

At 804, the processor-based system stores the image information data from the imaging sensors 216 into the digital storage device 206.

The method to capture video data 800 may terminate at 812, until invoke again.

Figure 9:
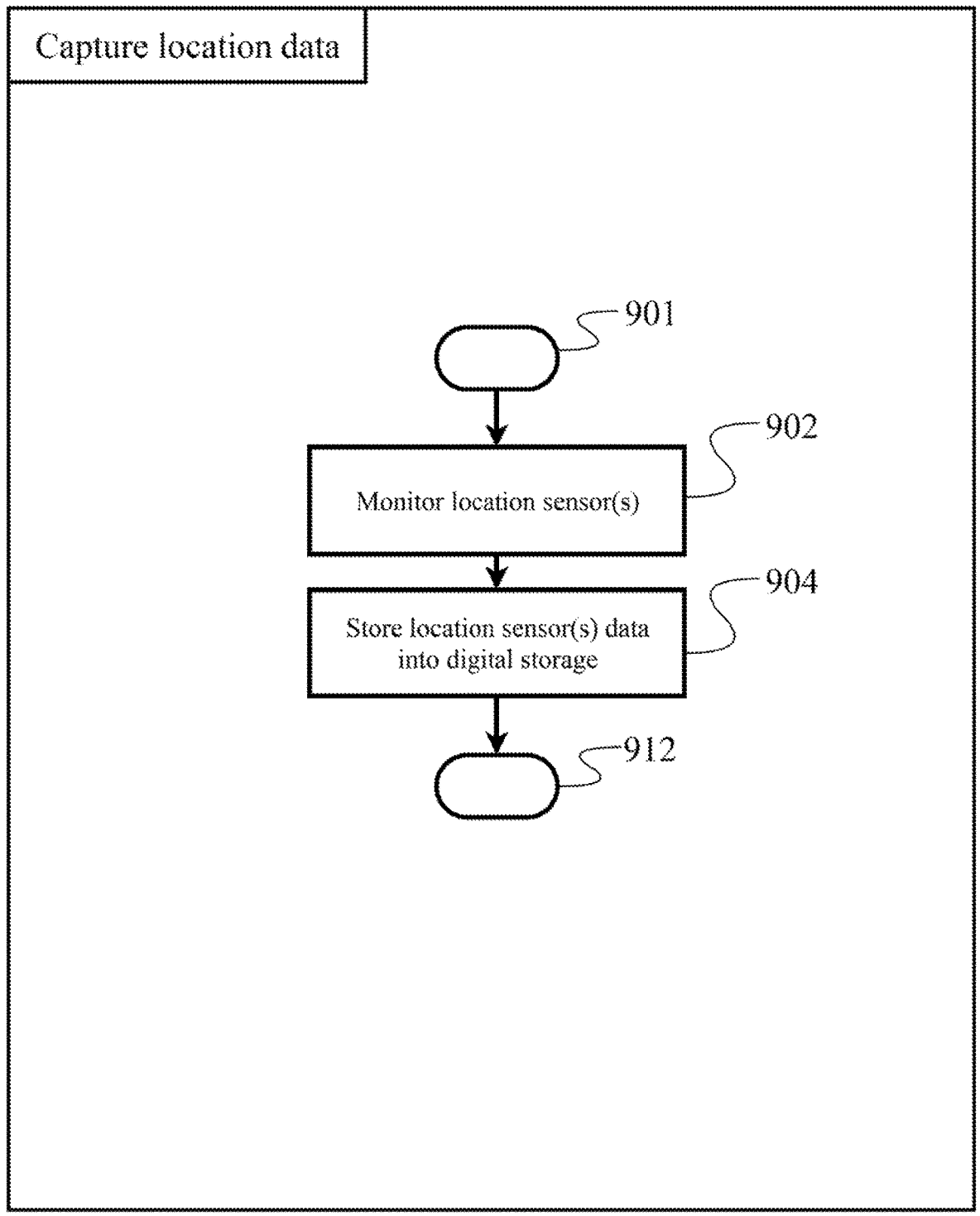
FIG. 9 is a flow diagram showing a low level method of operation in a processor-based system according to at least one illustrated implementation, the method which can be employed in performing an location capture of the method of FIG. 6.

FIG. 9 shows a method to capture location data 900, according to at least one illustrated implementation. A processor-based system may perform the method to capture location data 900 when the processor-based system is receiving image sensor location information from motion, position, and orientation sensor component(s) of a humanoid robot 104. The method to capture location data 900 may be performed as part of executing the method 600 (FIG. 6) or the method 700 (FIG. 7).

The method to capture location data 900, in part, prepares the processor based system or humanoid robot 104 for the environment mapping and updating procedure. Method 900 may implement all or a portion of the capturing location data operation 606 of method 600 (FIG. 6) or capturing location data operation 708 of method 700 (FIG. 7). Various acts of method 900 are optional, and may be performed in a different order than presented.

The method to capture location data 900 starts at 901. For example, the method to capture location data 900 may start in response to a call or invocation from a calling routine or program.

At 902, the processor-based system monitors the data output of the one or more motion, position, and orientation sensors 218 and 220.

At 904, the processor-based system stores the location information data from the one or more motion, position, and orientation sensors 218 and 220 into the digital storage device 206.

The method to capture location data 900 may terminate at 912, until invoke again.

Figure 10:
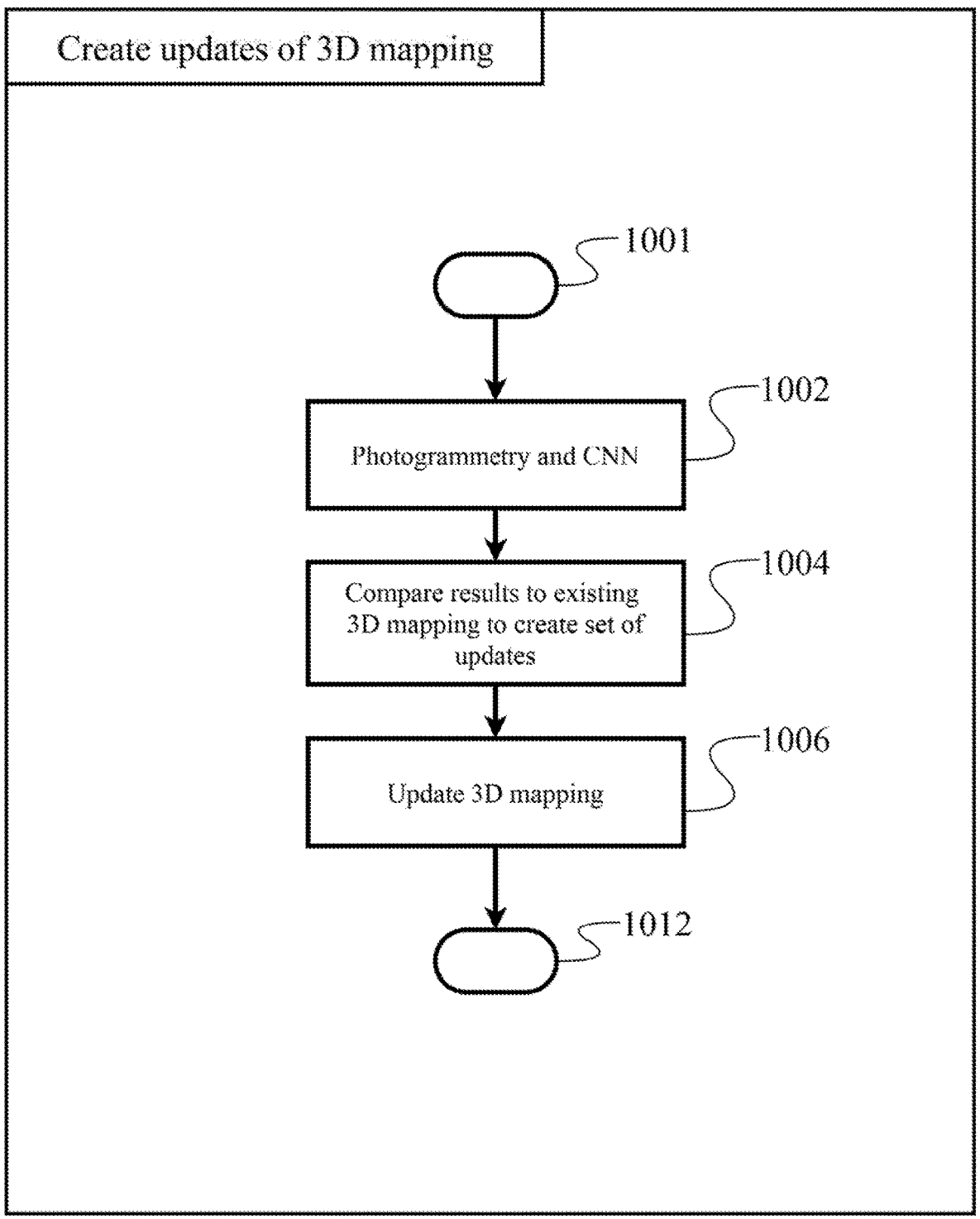
FIG. 10 is a flow diagram showing a low level method of operation in a processor-based system according to at least one illustrated implementation, the method which can be employed in performing an environmental mapping of the method of FIG. 6.

FIG. 10 shows a method to generate environment map update information 1000, according to at least one illustrated implementation. A processor-based system may perform the method to generate environment map update information 1000 when the processor-based system is generates a set of updates that represent, in digital form, a set of changes to the digital representation or model of the environment in which the humanoid robot 104 operates, in order to provide a virtual representation to a human pilot. The method to generate set of updates 1000 may be performed as part of executing the method 600 (FIG. 6).

The method to generate the set of updates 1000, in part, creates a virtual mapping of the at least a portion of the environment in which the humanoid robot 104 operates for use in the environment mapping and updating procedure. Method 1000 may implement all or a portion of the creating environment map operation 608 of method 600 (FIG. 6). Various acts of method 1000 are optional, and may be performed in a different order than presented.

The method to generate sets of updates 1000 starts at 1001. For example, the method to generate sets of updates 1000 may start in response to a call or invocation from a calling routine or program.

At 1002, a processor-based system executes one or more photogrammetry routines and employs one or more convolutional neural network to generate a three-dimensional representation of at least a portion of the environment represented in the images captured by the imaging sensor(s) 216. The photogrammetry routine(s) may also use the location data captured in method 900, image and location data captured in earlier applications of the method 600, or an artificial intelligence routine that identifies objects in the provided image data.

At 1004, the processor-based system compares the three-dimensional representation of a portion of the environment generated at 1002 with a three-dimensional representation of an entire environment in the vicinity of the humanoid robot 104, the three-dimensional representation of an entire environment previously generated by the processor-based system. The processor-based system may compare object positions at different points in time to derive physical information such as speed, acceleration, mass, center-of-mass, change in physical dimensions (e.g. shape), etc. The processor-based system may also compare different representations to achieve greater accuracy in representation by adding further detail not captured in previous representations. A set of updates to the three-dimensional mapping is derived from the comparison.

In some implementations, the processor-based system may create at least one digital representation of at least a portion of an environment in which the robot is located based where the at least one digital representation also represents: a set information that represents a certainty of a presence of at least one of: one or more objects, one or more surfaces, one or more obstacles, one or more humans, or one or more animals that were previously detected outside of the views provided by the image sensors. For example, the processor-based system may generate the set of information that represents a certainty based at least in part on a period of time in which one or more of the three-dimensional mapping of one or more portions of the environment were most recently detected in the field-of-view of one or more image sensors.

In some implementations, the processor-based system may also employ other sensory information to create the at least one digital representation of at least a portion of an environment in which the robot is located, these other sensory information may comprise encoders and force sensors relaying information regarding, for example, the mass, resistance to movement, and pliability of object that the robot interacts with physically.

At 1006, the processor-based system updates the three dimensional representation of the environment with the set of updates derived in 1004. As previously described, the processor-based system may also provide the updates to the I/O interface for presentation to a human pilot, in lieu of providing complete mappings each time, obviating the need for a relatively low latency and/or relatively high bandwidth channel between the robot and the pilot or otherwise reducing demand on the communication resources therebetween. These updates may be implemented locally to update a local instance of mapping at the I/O interface.

The method to generate sets of updates 1000 may terminate at 1012, until invoke again.

Figure 11:
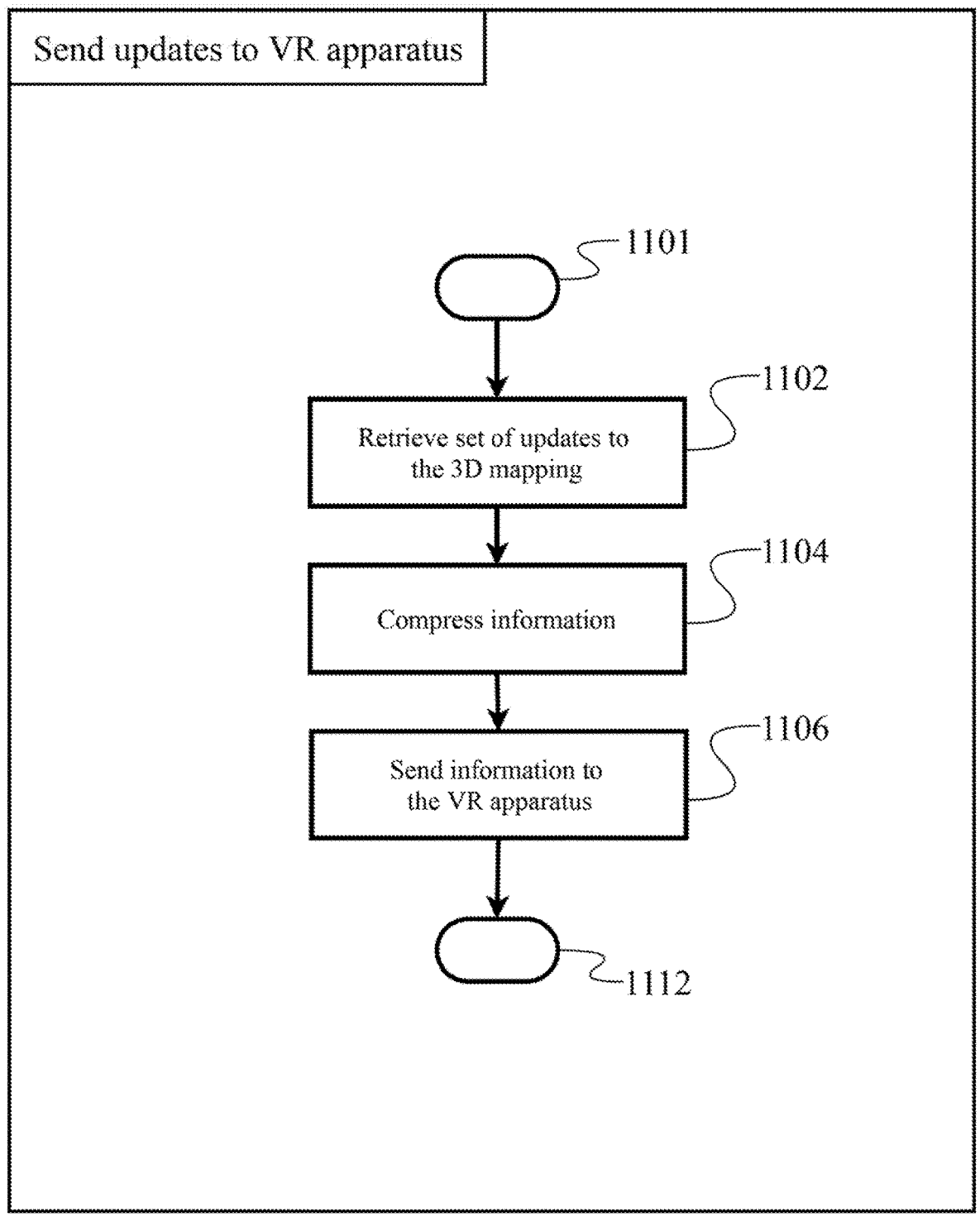
FIG. 11 is a flow diagram showing a low level method of operation in a processor-based system according to at least one illustrated implementation, the method which can be employed in performing an updating of the method of FIG. 6.

FIG. 11 shows a method 1100 to send sets of updates to for presentation to a human pilot, according to at least one illustrated implementation. A processor-based system may perform the method 1100 to send sets of updates 1100 through a network to update a virtual representation of the environment as presented to a human pilot. The method 1100 to send update information may be performed as part of executing the method 600 (FIG. 6).

The method to send set of updates, in part, sends the set of updates derived in 1004 to one or more components of the I/O interface 302 worn by the human pilot at an interface 118. Method 1100 may implement all or a portion of the sending updates operation 610 of method 600 (FIG. 6). Various acts of method 1100 are optional, and may be performed in a different order than presented.

The method 1100 to send sets of updates starts at 1101. For example, the method 1100 to end sets of updates may start in response to a call or invocation from a calling routine or program.

At 1102, the processor-based system retrieves the set of updates derived in 1004. These are changes to the three-dimensional digital representation of environment since a last time the processor-bases system executed the method 1100. These changes include changes to position, velocity, mass, or any other information that was added or altered or removed in the intervening time.

At 1104, the processor-based system compresses the retrieved information into a more compact file.

At 1106, the processor-based system transmits the compressed file to one or more components of the I/O interface 302 worn by the human pilot at an interface 118 through network 112.

The method 1100 to send sets of updates to I/O interface may terminate at 1112, until invoke again.

Figure 12:
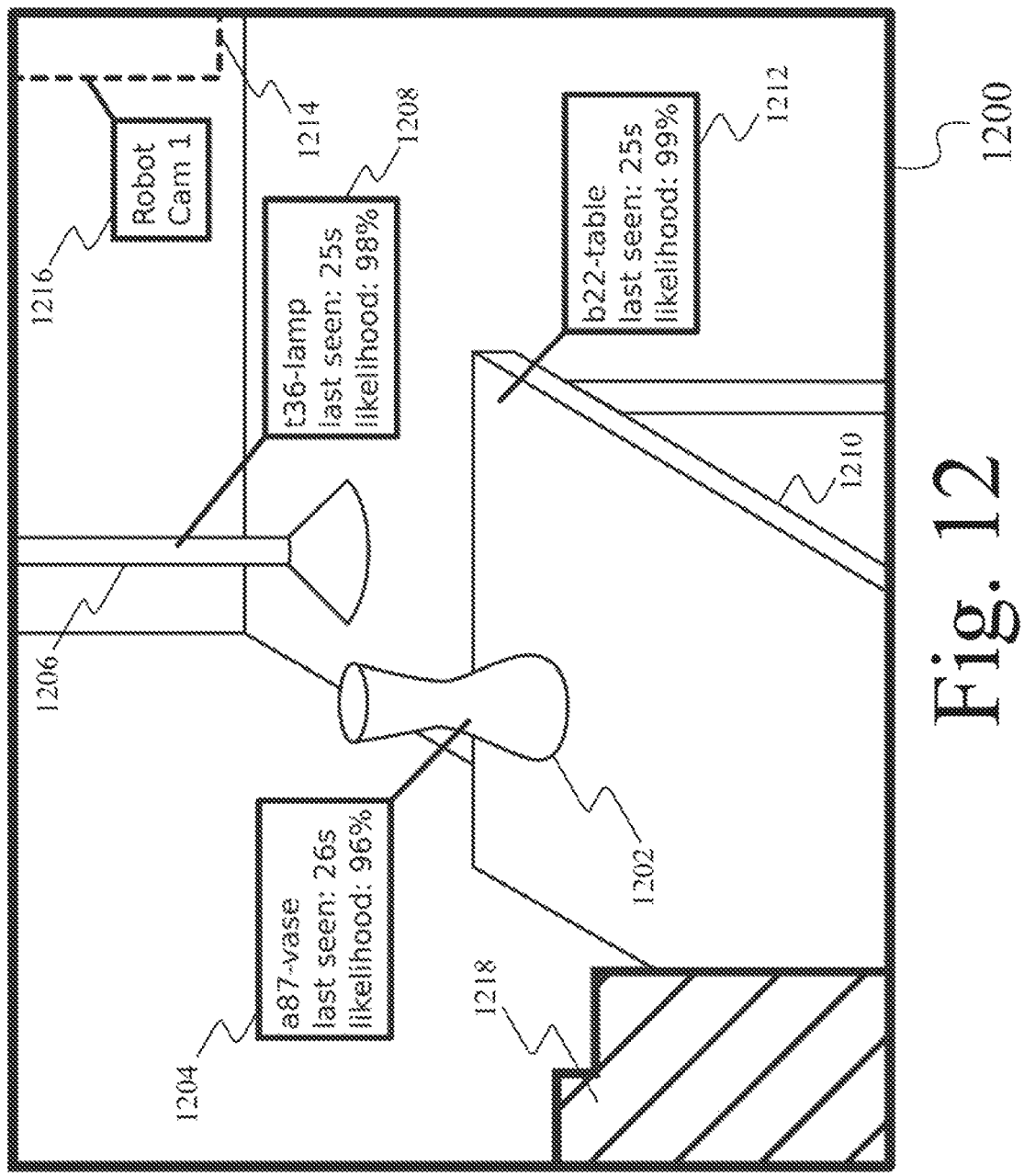
FIG. 12 is an isometric view of an three-dimensional mapping of an environment in which a robot operates augmented with information, for instance probability information, the three-dimensional mapping augmented with information generated via a processor-based system according to at least one illustrated implementation, the three-dimensional mapping augmented with information may be stored or converted into and stored as a digital representation in non-transitory computer- or processor-readable media.

FIG. 12 illustrates an example of a virtual representation of a portion of an environment in which a robot operates, as presented to a human pilot, and hence denominated as a pilot view 1200. The human pilot is presented with a virtual view of the environment, that includes visual representations of relevant objects and information. The virtual view may include virtual representations of various objects 1202, 1206, and 1210. Each virtual representation of an object may also include a respective information overlay 1204, 1208, and 1212. The respective information overlay 1204, 1208, and 1212 may include respective identifiers, physical information (such as mass, volume, velocity, position), information on when the object was last directly observed by the robot, and/or an estimate of a probability or likelihood of the object currently being in a given position.

The human pilot may also be presented with a virtual bounding box indicating a current location of, or area encompassed by, the field-of-view of various image sensors (e.g. camera(s) coupled to, or part of, the robot 1214. The virtual bounding box may also be accompanied by an overlay 1216 which may contain information identifying the robot and camera view.

In different implementations of the described methods, the pilot view 1200 may be a three-dimensional point-cloud, polygonal, NURBS surfaces, CAD models, voxel, Bézier surfaces or similar representation of the environment.

Figure 13:
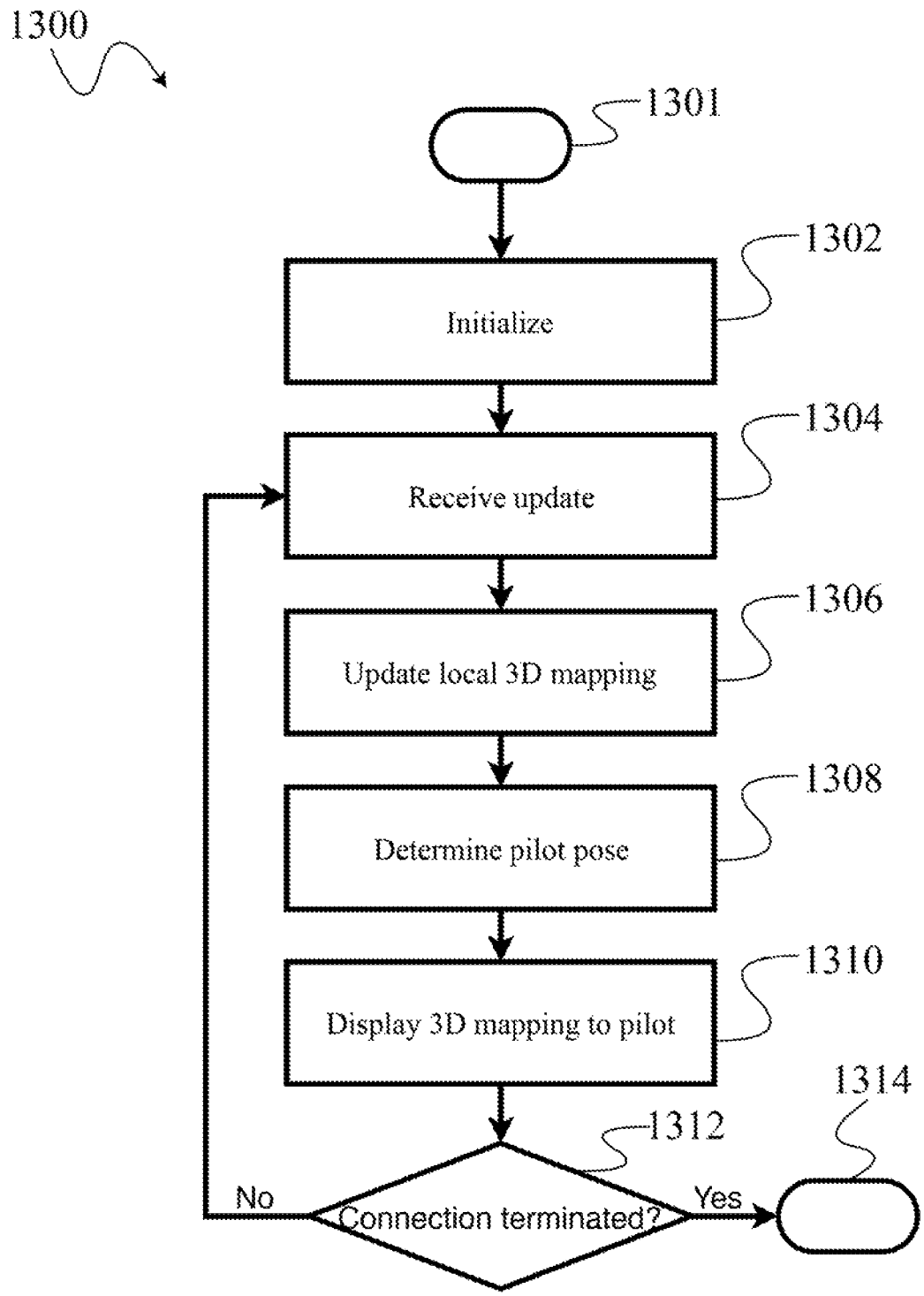
FIG. 13 is a flow diagram showing a high level method of operation in a processor-based system according to at least one illustrated implementation.

FIG. 13 shows overall high level method 1300 performed by a processor-based system, such as circuitry or at least one hardware processor, for operation in a computer system such as I/O interface 302 or a processor-based system co-located with the heads up display according to at least one illustrated implementation. The method 1300, in part, is an example of how an I/O system (e.g., heads up display) and/or associated (e.g., co-located) processor-based computer system may cause a presentation to a human pilot of a virtual environment (e.g., virtual reality environment) that represents the physical environment as sensed by the robot.

The method 1300, and other methods described herein, may be varied to include other acts, omit acts, and/or vary acts, or perform acts in a different order to accommodate alternative implementations. The method 1300 is described as being performed by a processor-based system, for example, one or more processors in processing subsystem 402, in conjunction with other components, such as those found in system 100, robot 200, or the I/O interface system 400. The processor-based system in this and other methods is referred to as singular but may be performed by multiple processor-based system. In overall method 1300 and other methods a processor-based system may be described as performing an act and this includes performing the act or causing the act to be performed. The processor-based system performs overall method 1300 in response to executing processor-executable instructions or other logic.

At 1301, the method 1300 starts. For example, the method 1300 may start in response to a startup of the processor-based system or component thereof, a user input, a new frame generated by an image sensor (e.g., camera), or a call or invocation from a calling routine or program.

At 1302, the processor-based system initializes one or more components. At 1304, the processor-based system receives updates transmitted by the humanoid robot 104 or by a processor-based system co-located with the humanoid robot 104 and/or communicatively thereto via a relatively low latency communications channel. At 1306, the humanoid robot 104 or updates a local version of a digital representation of at least a portion of an environment in which the humanoid robot operates. At 1308, the processor-based system determines a pose (i.e., position, orientation, position and orientation) of the human pilot and/or a portion thereof (e.g., pose of the head, eyes, limbs, fingers, and/or body). At 1310, the processor-based system causes at least one display device or screen (e.g., head worn heads up display) to visually present to the human pilot a virtual representation of at least a portion of the environment in which the humanoid robot operates.

At 1312, the processor-based system checks the status of the couplings between the VR apparatus and the network 112. If the coupling is active, the method 1300 may continuously or periodically repeat from 1304 while the system is operational. The method 1300 may terminate at 1312 until invoked again.

Figure 14:
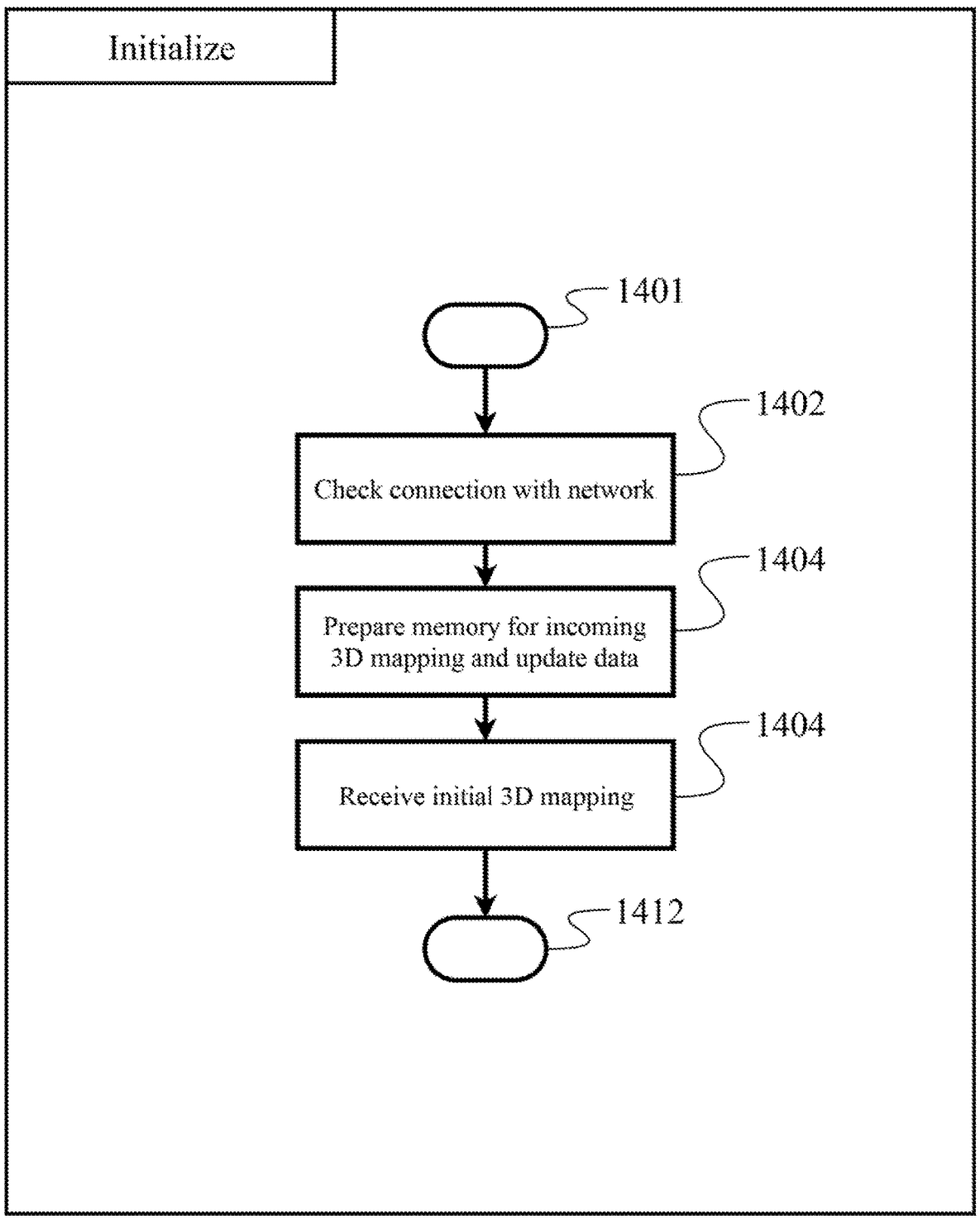
FIG. 14 is a flow diagram showing a low level method of operation in a processor-based system according to at least one illustrated implementation, the method which can be employed in performing an initialization of the method of FIG. 13.

FIG. 14 shows a method 1400 to initialize an I/O system (e.g., heads up display) and/or associated (e.g., co-located) processor-based computer system and receive the initial three-dimensional mapping, according to at least one illustrated implementation. The method 1400 to initialize an I/O system (e.g., heads up display) and/or associated (e.g., co-located) processor-based computer system and receive the initial three-dimensional mapping may be performed as part of executing the method 1300 (FIG. 13).

The method 1400 to initialize an I/O system (e.g., heads up display) and/or associated (e.g., co-located) processor-based computer system and receive the initial three-dimensional mapping, in part, prepares the I/O system (e.g., heads up display) and/or associated (e.g., co-located) processor-based computer system to receive and process sets of updates that represent changes in the digital representation of the environment from previous instances of the digital representation of the environment) and for display operations as well as receives the initial three-dimensional mapping. Method 1400 may implement all or a portion of the initialization operation 1302 of method 1300 (FIG. 13). Various acts of method 1400 are optional, and may be performed in a different order than presented.

The method to initialize 1400 starts at 1401. For example, the method to initialize 1400 may start in response to a call or invocation from a calling routine or program.

At 1402, a processor-based computer system ensures that a communications connection exists with the humanoid robot 104 and/or associated (e.g., co-located and/or communicatively coupled by a low latency channel) processor-based computer system through some network 112. If a communications connection does not exist, the processor-based computer system may attempt to establish a communications connection.

At 1404, the processor-based computer system prepares for the incoming data by ensuring that sufficient digital storage exists for the data.

At 1406, the processor-based computer system receives the initial three-dimensional mapping which may have been provided by a different processor-based system in method 600 (FIG. 6).

The method to initialize VR apparatus 1400 may terminate at 1412, until invoke again.

Figure 15:
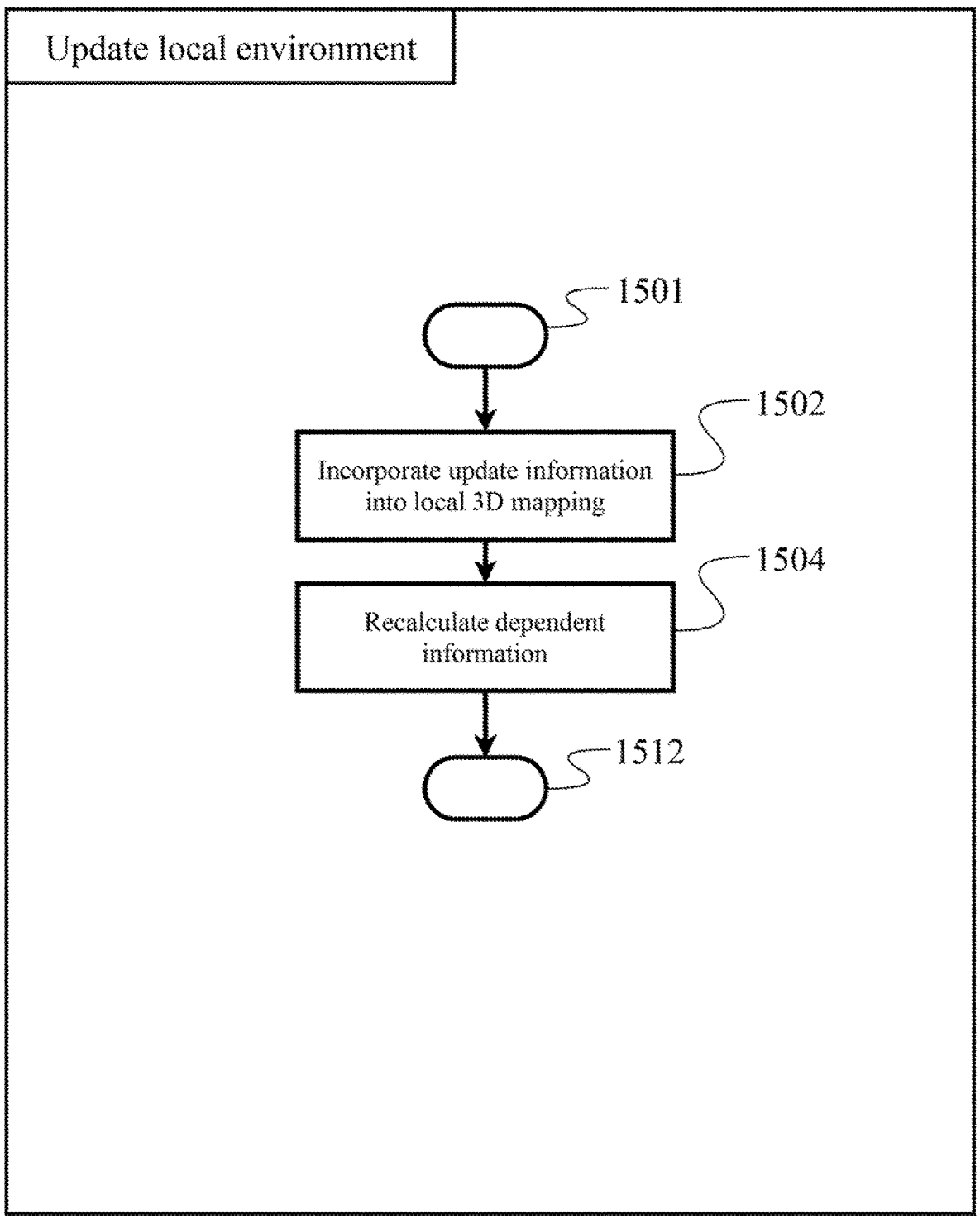
FIG. 15 is a flow diagram showing a low level method of operation in a processor-based system according to at least one illustrated implementation, the method which can be employed in performing a local environment update of the method of FIG. 13.

FIG. 15 shows a method 1500 to update a local version of a digital representation of the environment representation, according to at least one illustrated implementation. The local version may, for example, be stored by or proximate a human interface device (e.g., heads up display). A processor-based computer system may perform the method 1500 to update the local version of the digital representation of the environment when the processor-based computer system acquires sets of updates to the local representation that have not been implemented. The method 1500 to update the local version of the digital representation of the environment representation may be performed as part of executing the method 1300 (FIG. 13).

The method 1500 to update the local version of the digital representation of the environment representation, in part, implements sets of updates sent or provided by the humanoid robot or associated (e.g., co-located and/or communicatively coupled by a low latency channel) processor-based computer system, the updates, in digital form, which represent changes in the environment in which the humanoid robot operates over successive times. Method 1500 may implement all or a portion of the update local environment operation 1304 of method 1300 (FIG. 13). Various acts of method 1500 are optional, and may be performed in a different order than presented.

The method 1500 to update the local version of the digital representation of the environment representation starts at 1501. For example, the method 1500 to update may start in response to a call or invocation from a calling routine or program.

At 1502, the processor-based computer system incorporates all unincorporated updates to the local digital representation of the environment in which the robot operates. Updates may be relative to the previous update or relative to a predetermined base-line, such as relative to the first mapping, the first mapping in a given minute, etc.

At 1504, the processor-based computer system recalculates any dependent information that may have changed due to the implemented updates. Dependent information may comprise calculated physical information, such as velocity, volume, and mass. The dependent information may be recalculated using the physics engine.

The method to update the local version of the environment representation 1500 may terminate at 1512, until invoke again.

Figure 16:
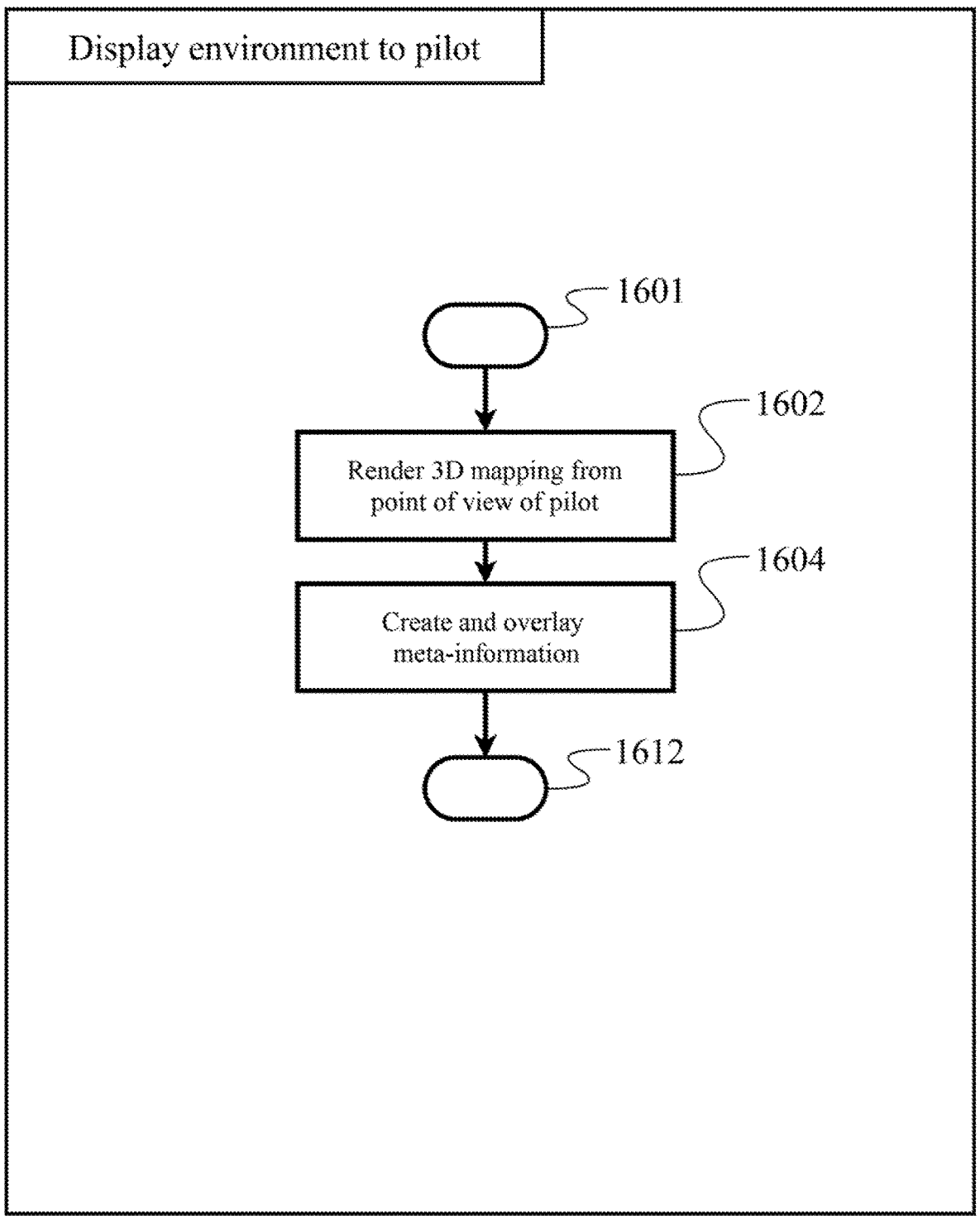
FIG. 16 is a flow diagram showing a low level method of operation in a processor-based system according to at least one illustrated implementation, the method which can be employed in performing a presentation of a virtual or augmented environment to a pilot of the method of FIG. 13.

FIG. 16 shows a method 1600 to cause presentation to a human pilot of a virtual representation of an environment in which a robot operates a human, according to at least one illustrated implementation. The method 1600 to cause presentation of environment to the human pilot may be performed as part of executing the method 1300 (FIG. 13).

The method 1600 to cause presentation of a virtual representation of the environment to the human pilot, in part, causes displays of a virtual representation of the environment in which the humanoid robot operates, employing locally stored digital representations of the environment and sets of updates to the digital representations of the environment. Method 1600 may implement all or a portion of the display environment to pilot operation 1310 of method 1300 (FIG. 13). Various acts of method 1600 are optional, and may be performed in a different order than presented.

The method 1600 to cause presentation of a virtual representation of the environment to the human pilot starts at 1601. For example, the method to send 1600 may start in response to a call or invocation from a calling routine or program.

At 1602, a processor-based computer system renders, or causes to be rendered, a digital image of the virtual environment from the point of view of the human operator using the pilot location information.

At 1604, the processor-based computer system renders, or causes to be rendered a visual overlay with relevant information for the user, such as identification of visible object and pose of the camera views of the humanoid robot 104.

The method 1600 to cause presentation of environment to the pilot 1600 may terminate at 1612, until invoke again.

Figure 17:
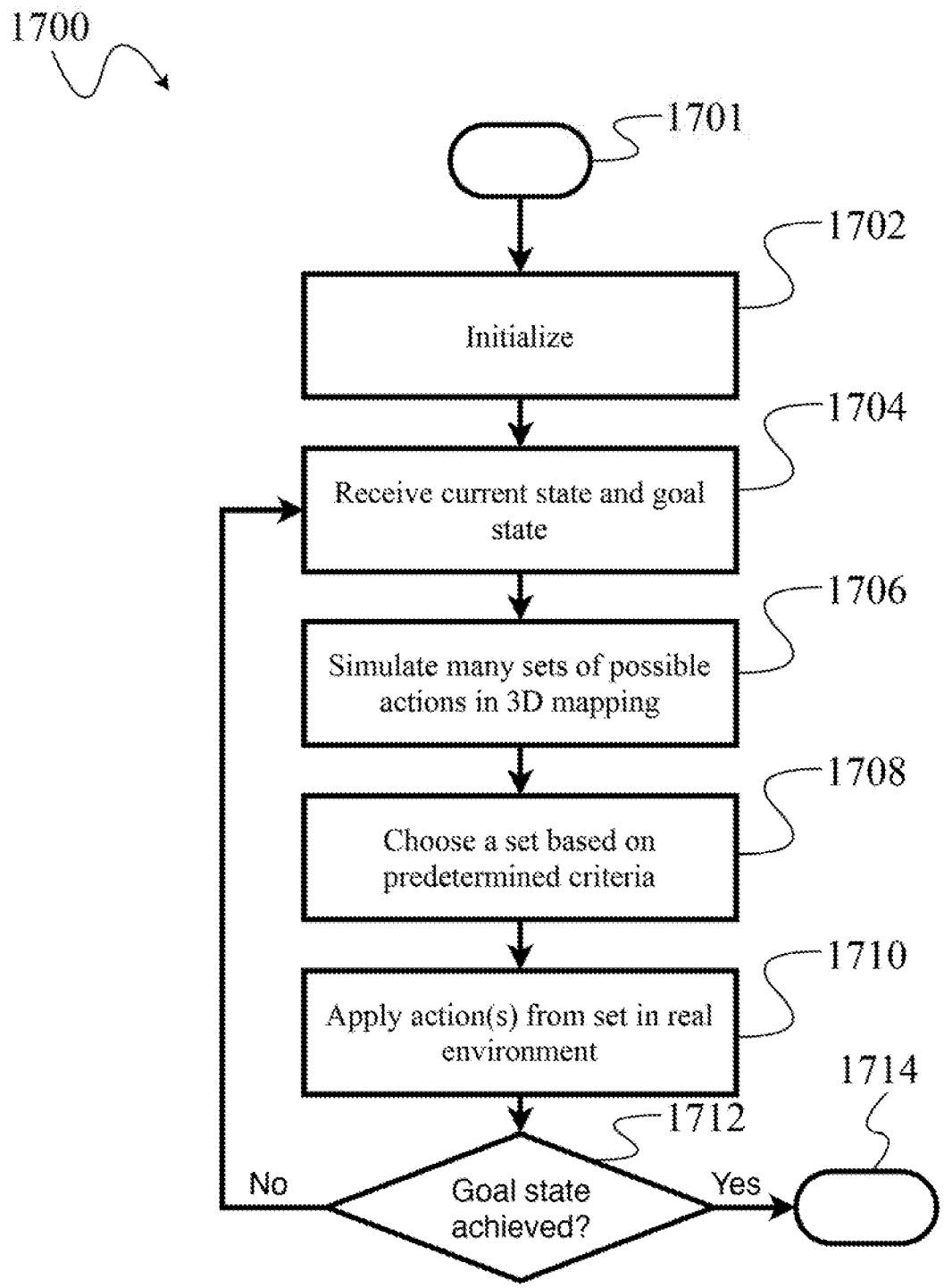
FIG. 17 is a flow diagram showing a high level method of operation in a processor-based system according to at least one illustrated implementation.

FIG. 17 shows a high level method 1700 performed by a processor-based system, such as circuitry or at least one hardware processor, for operation in a computer system such as humanoid robot 104 according to at least one illustrated implementation. The method 1700, in part, is an example of how a computer system may create a set of actions executable by a humanoid robot that enables the humanoid robot to achieve a goal state given a digital representation of a physical environment in which the humanoid robot operates.

The method 1700, and other methods described herein, may be varied to include other acts, omit acts, and/or vary acts, or perform acts in a different order to accommodate alternative implementations. The method 1700 is described as being performed by a processor-based system, for example, one or more processors in processing subsystem 202, in conjunction with other components, such as those found in system 100, robot 200, or the human interface system 400. The processor-based system in this and other methods is referred to as singular but may be performed by multiple processor-based systems. In method 1700 and other methods a processor-based computer system may be described as performing an act and this includes performing the act or causing the act to be performed. The processor-based computer system performs method 1700 in response to executing processor-executable instructions or other logic.

At 1701, the method 1700 starts. For example, the method 1700 may start in response to a startup of the system or component thereof, a user input, a new frame generated by an image sensor (e.g., camera), or a call or invocation from a calling routine or program.

At 1702, a processor-based computer system initializes one or more components. At 1704, the processor-based computer system receives a current state of the humanoid robot 104 and the digital three-dimensional mapping of the environment of the humanoid robot 104 as well as the current goal state of the humanoid robot 104. At 1706, the processor-based computer system simulates a large set of possible actions the humanoid robot can take using the digital representation of environment. At 1708, the processor-based system chooses a set based on a predetermined criteria. At 1710, the processor-based computer system enacts the first action or actions from the set of actions determined to be most efficient. At 1712 the processor-based computer system determines whether or not the goal state has been achieved. If the goal state has not been achieved, the processor-based computer system returns to 1704, otherwise, proceeds to end node 1714.

The method 1700 may terminate at 1714 until invoked again. Alternatively, the method 1700 may continuously or periodically repeat while the system is operational.

Figure 18:
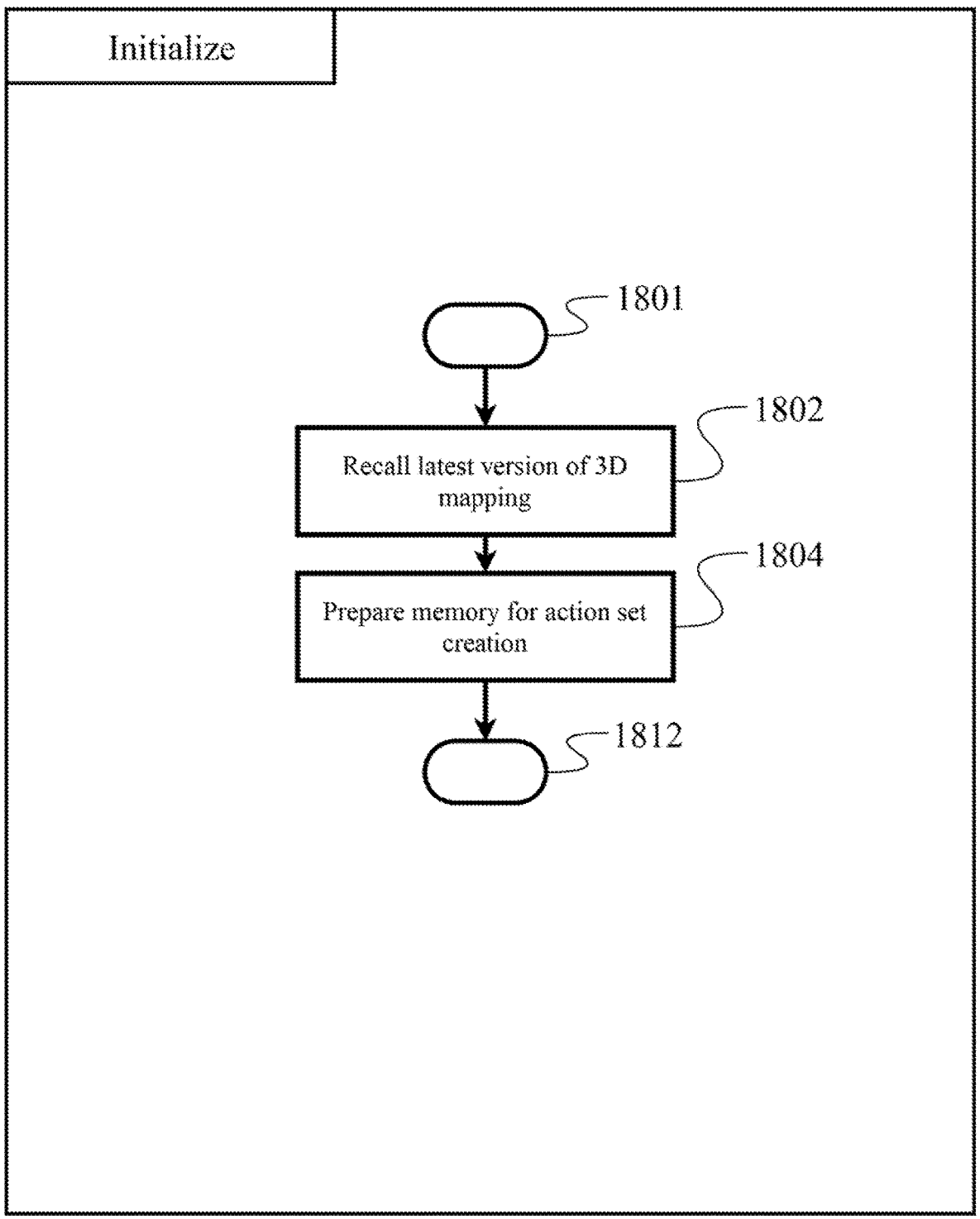
FIG. 18 is a flow diagram showing a low level method of operation in a processor-based system according to at least one illustrated implementation, the method which can be employed in performing an initialization of the method of FIG. 17.

FIG. 18 shows a method 1800 to initialize, according to at least one illustrated implementation. A processor-based computer system may perform the method to initialize 1800 when the processor-based system is preparing the humanoid robot for the action decision process. The method 1800 to initialize may be performed as part of executing the method 1700 (FIG. 17).

The method 1800 to initialize, in part, prepares the processor-based computer system to create and choose or select an action set. Method 1800 may implement all or a portion of the initialization operation 1702 of method 1700 (FIG. 17). Various acts of method 1800 are optional, and may be performed in a different order than presented.

The method 1800 to initialize starts at 1801. For example, the method to initialize 1800 may start in response to a call or invocation from a calling routine or program.

At 1802, a processor-based computer system recalls a most recent version of the digital representation of the environment in which the humanoid robot operates from a digital storage medium.

At 1804, the processor-based computer system prepares sufficient digital storage medium for the action sets to be created in the following methods.

The method 1800 to initialize may terminate at 1812, until invoke again.

Figure 19:
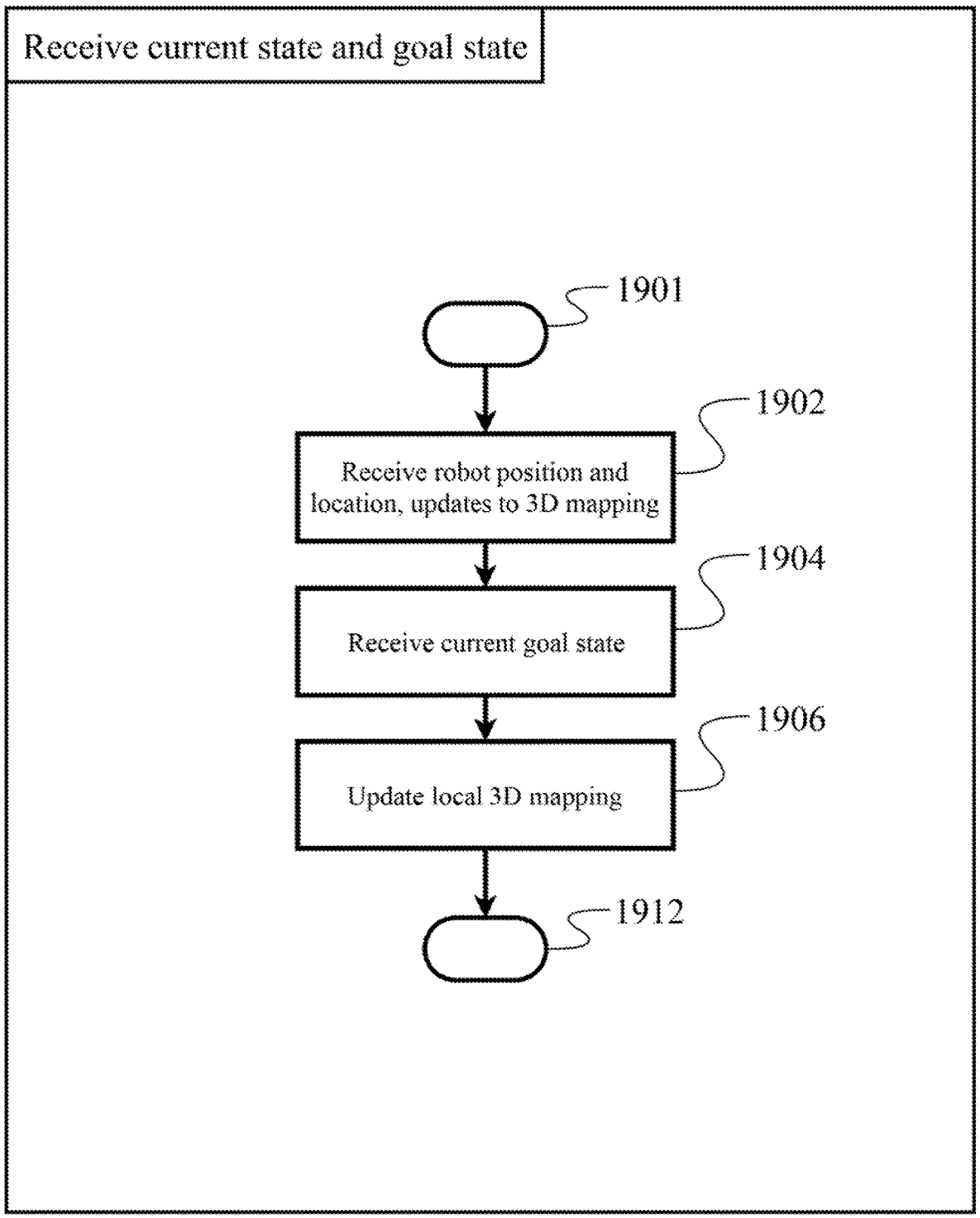
FIG. 19 is a flow diagram showing a low level method of operation in a processor-based system according to at least one illustrated implementation, the method which can be employed in performing a receipt of a current state and goal of the method of FIG. 17.

FIG. 19 shows a method 1900 to receive current state and goal state, according to at least one illustrated implementation. The method 1900 to receive current state and goal state may be performed as part of executing the method 1700 (FIG. 17).

The method 1900 to receive current state and goal state, in part, updates a current digital representation of the environment in which the humanoid robot operates, and retrieves a current goal state. Method 1900 may implement all or a portion of the receive current state and goal operation 1704 of method 1700 (FIG. 17). Various acts of method 1900 are optional, and may be performed in a different order than presented.

The method 1900 to receive current state and goal state starts at 1901. For example, the method 1900 to receive current state and goal state may start in response to a call or invocation from a calling routine or program.

At 1902, a processor-based computer system receive the humanoid robot position in the environment, limb, appendage, and head positions, and updates to the virtual environment.

At 1904, the processor-based computer system receive the current goal state for the humanoid robot. This may be a position or pose criteria, such as "move left hand to pen on the table" or "grasp pen on table with left hand fingers", location criteria, such as "move 1.5 m North" or "move to kitchen", or some other movement based task, and may be represented in any of a large variety of forms (e.g., configuration space or C-space, real world coordinates).

At 1906, the processor-based computer system updates the local digital representation of the environment in which the humanoid robot operates using the information received at 1902. The method 1900 to receive current state and goal state may terminate at 1912, until invoke again.

Figure 20:
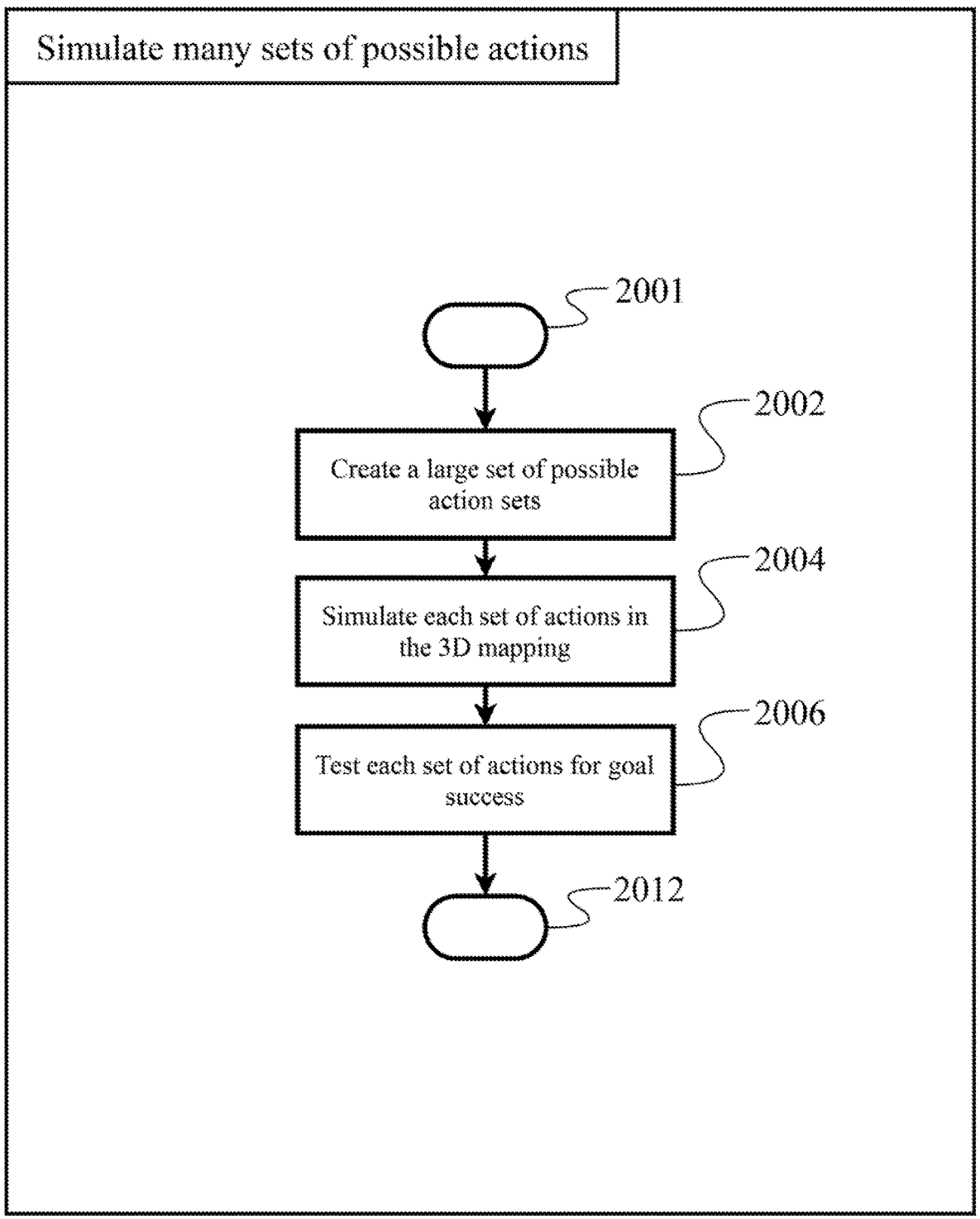
FIG. 20 is a flow diagram showing a low level method of operation in a processor-based system according to at least one illustrated implementation, the method which can be employed in performing a simulation of the method of FIG. 17.

FIG. 20 shows a method 2000 to simulate many sets of possible actions, according to at least one illustrated implementation. The method 2000 to simulate many sets of possible actions may be performed as part of executing the method 1700 (FIG. 17).

The method 2000 to simulate many sets of possible actions, in part, creates and tests a large number of possibly actions that may achieve the goal. Method 2000 may implement all or a portion of the simulate many sets of possible actions operation 1706 of method 1700 (FIG. 17). Various acts of method 2000 are optional, and may be performed in a different order than presented.

The method 2000 to simulate many sets of possible actions starts at 2001. For example, the method 2000 to simulate many sets of possible actions may start in response to a call or invocation from a calling routine or program.

At 2002, a processor-based computer system creates a large number of sets of actions that the humanoid robot is able to enact. These actions may be generated through some form of random trial, may be selected from a set of predetermined actions, may have been trained by a human pilot, or may be created through a specific algorithm.

At 2004, the processor-based computer system simulates the humanoid robot undertaking each set of actions in the digital representation or model. This can be considered a virtual environment, although may be presented as a visual virtual representation to a human pilot.

At 2006, the processor-based computer system tests each set of actions to determine if any of the sets of actions successfully arrive at the goal state. If none of the tested sets of actions are fully successful at arriving at the goal state, the sets of action that place the humanoid robot close to the goal state are considered successful.

The method 2000 to simulate many sets of possible actions may terminate at 2012, until invoke again.

Figure 21:
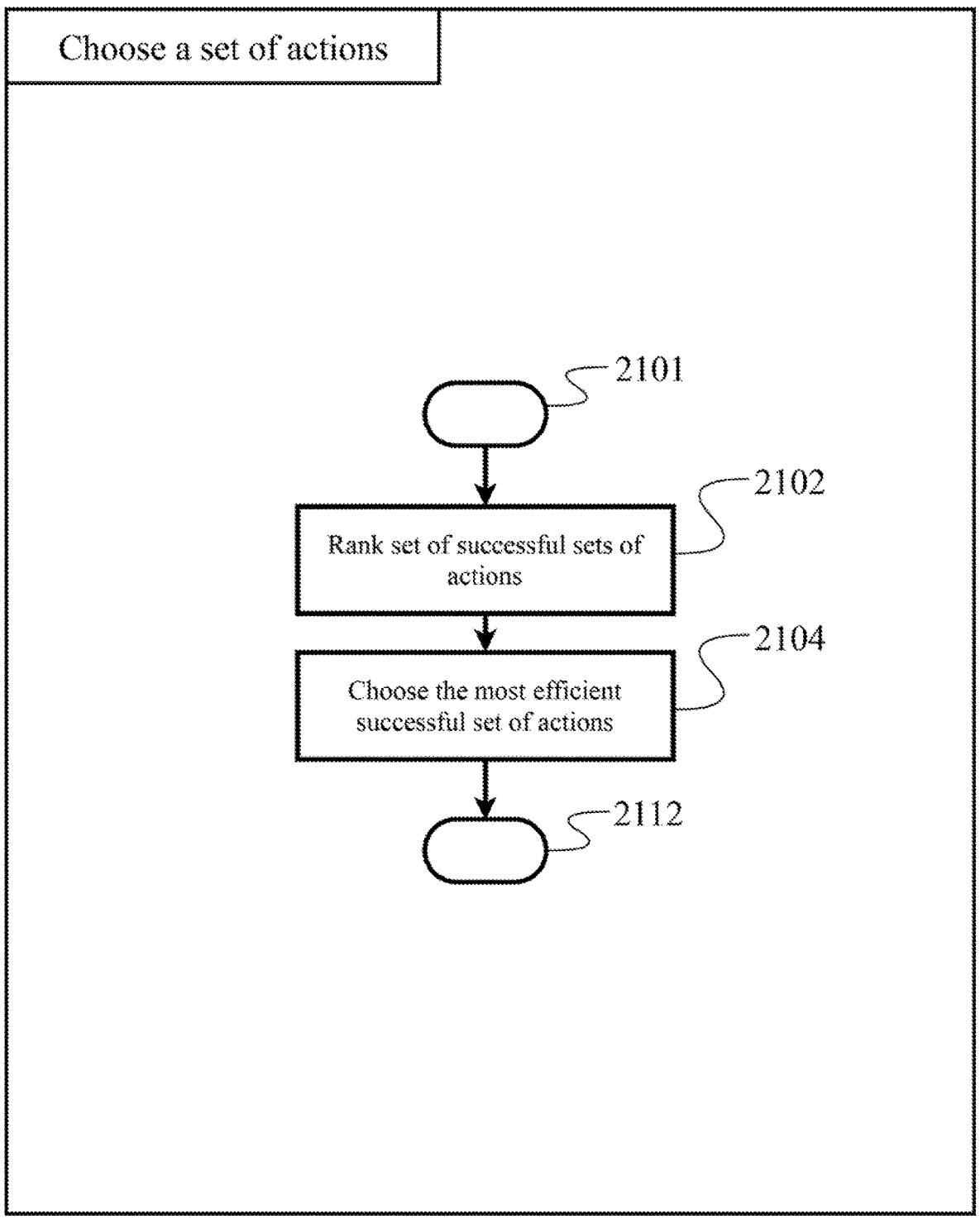
FIG. 21 is a flow diagram showing a low level method of operation in a processor-based system according to at least one illustrated implementation, the method which can be employed in performing a selection of a set of actions or movements of the method of FIG. 17.

FIG. 21 shows a method 2100 to choose or select a set of actions to implement, according to at least one illustrated implementation. The method 2100 to choose or select a set of actions to implement may be performed as part of executing the method 1700 (FIG. 17).

The method 2100 to choose or select a set of actions to implement, in part, chooses one of the successful sets of actions according to a predetermined efficiency criteria. Method 2100 may implement all or a portion of the choose a set of actions operation 1708 of method 1700 (FIG. 17). Various acts of method 2100 are optional, and may be performed in a different order than presented.

The method 2100 to choose or select a set of actions to implement starts at 2101. For example, the method 2100 to choose or select a set of actions to implement may start in response to a call or invocation from a calling routine or program.

At 2102, a processor-based computer system ranks the set of successful sets of actions created previously according to a set of criteria. according to a set of criteria. This criteria may be, or include, a measure of efficiency, which may be defined as an energy expenditure or an amount of work required of the humanoid robot undertaking the actions in the respective set of actions.

At 2104, the processor-based computer system chooses the highest ranked set of actions.

The method 2100 to choose or select a set of actions to implement may terminate at 2112, until invoke again.

Figure 22:
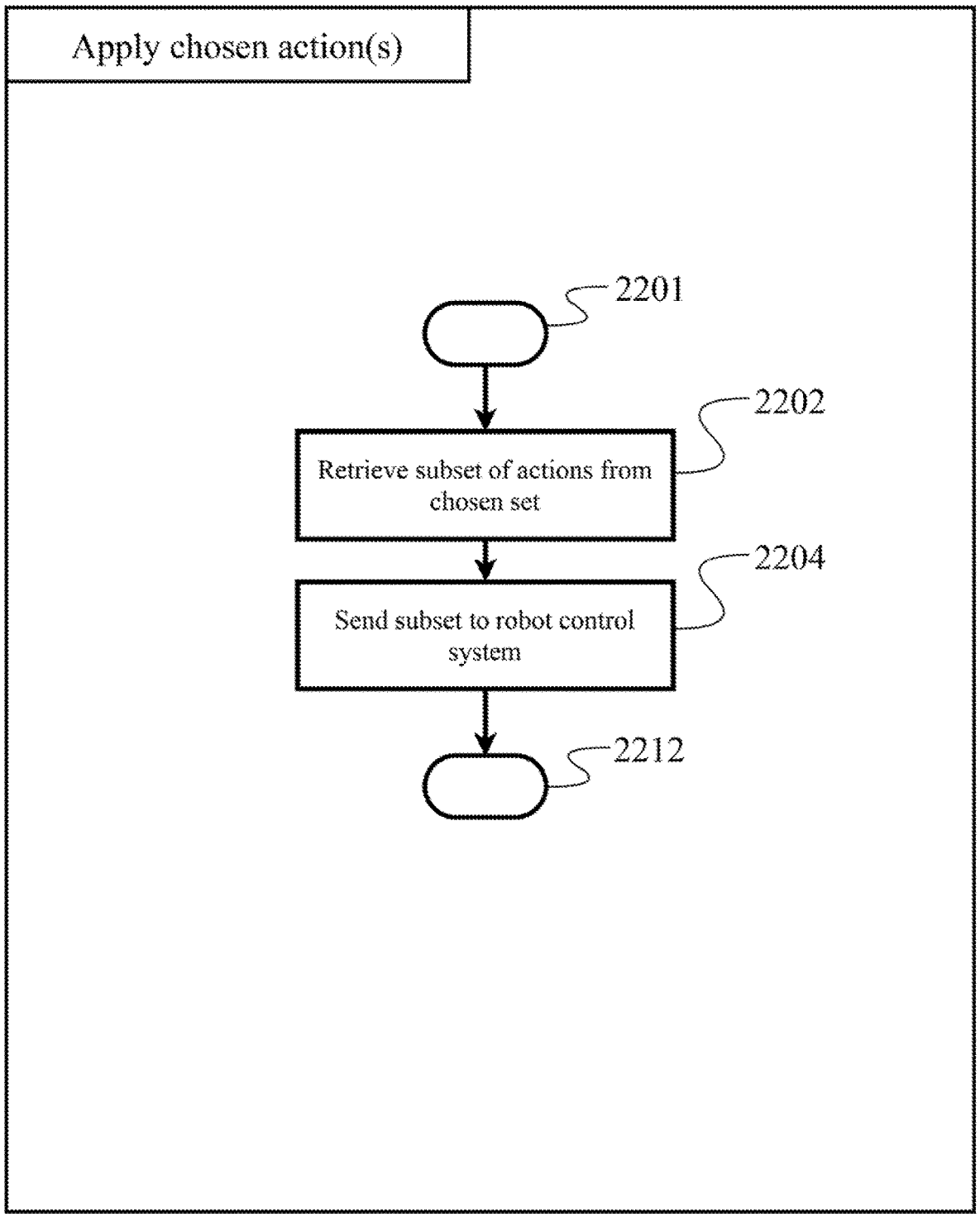
FIG. 22 is a flow diagram showing a low level method of operation in a processor-based system according to at least one illustrated implementation, the method which can be employed in performing an application of a selected set of actions or movements of the method of FIG. 17.

FIG. 22 shows a method 2200 to apply a subset of the chosen action set, according to at least one illustrated implementation. The method 2200 to apply a subset of the chosen action set may be performed as part of executing the method 1700 (FIG. 17).

The method 2200 to apply a subset of the chosen action set, in part, applies a small subset of the actions in the chosen set, which may be the first action, or the first subset of actions. Method 2200 may implement all or a portion of the applying action(s) in real environment operation 1710 of method 1700 (FIG. 17). Various acts of method 2200 are optional, and may be performed in a different order than presented.

The method 2200 to apply a subset of the chosen action set starts at 2201. For example, the method for applying a subset of the chosen action set 2200 may start in response to a call or invocation from a calling routine or program.

At 2202, a processor-based computer system retrieves a subset at the beginning of the chosen set. This subset may be the first action only or may be the first subset of actions that can be applied in a given time step.

At 2204, the processor-based computer system sends the collected subset of actions to a control system that controls the humanoid robot for execution thereby.

The method 2200 to apply a subset of the chosen action set may terminate at 2212, until invoke again.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Boolean circuits, Application Specific Integrated Circuits (ASICs) and/or FPGAs. However, those skilled in the art will recognize that the embodiments disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being implemented in hardware, for example in one or more FPGAs or ASICs.

The various embodiments described above can be combined to provide further embodiments. All of the commonly assigned US patent application publications, US patent applications, foreign patents, and foreign patent applications referred to in this specification and/or listed in the Application Data Sheet, including but not limited to U.S. 62/902,824, are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to implement a visual interface for a pilot of a robot, the method comprising:

generating, by a first processor on-board the robot, at least one digital representation of at least a portion of an environment in which the robot operates at a first time from at least one set of image information that represents at least one view of at least the portion of the environment in which the robot operates at the first time, the at least one view corresponding to a field-of-view encompassed at the first time by at least one image sensor that is communicatively coupled to the first processor of the robot;

transmitting, by a communication system communicatively to the first processor on-board the robot and to an I/O interface of the pilot, the at least one digital representation of at least a portion of an environment in which the robot operates at the first time;

causing, by a second processor communicatively coupled to the I/O interface of the pilot, a visual presentation of the at least one digital representation of at least a portion of the environment at the first time;

generating, by the first processor on-board the robot, at least one digital representation of at least a portion of an environment in which the robot operates at a second time from at least one set of image information that represents at least one view of at least the portion of the environment in which the robot operates at the second time, the at least one view corresponding to the field-of-view encompassed at the second time by the at least one image sensor that is communicatively coupled to the first processor of the robot;

generating, by the first processor on-board the robot, a set of comparisons that represent changes between the at least one digital representation of at least a portion of the environment in which the robot operates at the second time and the at least one digital representation of at least a portion of the environment in which the robot operates at the first time;

generating, by the first processor on-board the robot, a set of updates that represent changes to at least one digital representation based at least in part on the comparisons;

transmitting, by the communication system communicatively to the first processor on-board the robot, the set of updates to the I/O interface of the pilot, wherein the set of updates excludes the at least one digital representation of at least a portion of the environment in which the robot operates at the second time; and applying, by the second processor communicatively coupled to the I/O interface of the pilot, the updates to the visual presentation of the at least one digital representation of at least a portion of the environment at the first time to produce a visual presentation of the at least one digital representation of at least a portion of the environment and the second time without transmitting the complete at least one digital representation of at least a portion of an environment in which the robot operates at a second time in its entirety.

2. The method of claim 1, further comprising:
concurrently capturing images of views of the environment by each of at least two image sensors, the image sensor at least one of positioned or oriented differently from one another to provide perspective in the captured images.

3. The method of claim 2 wherein applying, by the second processor communicatively coupled to the I/O interface of the pilot, the updates to the visual presentation of the at least one digital representation of at least a portion of the environment at the first time includes causing at least one head-mounted display to present the updates to the visual presentation as at least one of a virtual reality or an augmented reality representation of at least the portion of the environment.

4. The method of claim 3 wherein generating, by a first processor on-board the robot, at least one digital representation of at least a portion of the environment based on at least one set of image information includes generating a three-dimensional mapping of one or more parts of the environment including at least one of: one or more objects, one or more surfaces, one or more obstacles, one or more humans, or one or more animals present in the environment.

5. The method of claim 4 wherein generating, by the first processor on-board the robot, a three-dimensional mapping of one or more parts of the environment includes performing photogrammetry on the captured images to determine at least one of relative spacing or relative orientation.

6. The method of claim 5 wherein generating, by the first processor on-board the robot, at least one digital representation of at least a portion of the environment comprises generating at least one digital representation that includes a set information that represents a certainty of a presence of at least one of: one or more objects, one or more surfaces, one or more obstacles, one or more humans, or one or more animals previously detected outside of the views provided by the image sensors.

7. The method of claim 6, further comprising:
generating, by the first processor on-board the robot, a set of information representative of a measure of certainty based at least in part on a period of time in which the three-dimensional mapping of one or more parts of the environment were most recently detected in the field-of-view of one or more image sensors.

8. A processor based robotic system, comprising:
at least one processor; and
at least one nontransitory processor-readable medium that stores processor executable instructions that, when executed by the at least one processor, cause the robotic system to:
generate at least one digital representation of at least a portion of an environment in which the robotic system operates at a first time from at least one set of image information that represents at least one view of at least the portion of the environment in which the robotic system operates at the first time, the at least one view corresponding to a field-of-view encompassed at the first time by at least one image sensor that is coupled to or a part of the robotic system;
transmit the at least one digital representation of at least a portion of an environment in which the robotic system operates at the first time;
generate at least one digital representation of at least a portion of an environment in which the robotic system operates at a second time from at least one set of image information that represents at least one view of at least the portion of the environment in which the robotic system operates at the second time, the at least one view corresponding to the field-of-view encompassed at the second time by the at least one image sensor that is coupled to or a part of the robotic system;
compare the at least one digital representation of at least a portion of the environment in which the robotic system operates at the second time and the at least one digital representation of at least a portion of the environment in which the robotic system operates at the first time;
generate a set of updates that represent changes to at least one digital representation based at least in part on the comparison; and
transmit the set of updates, wherein the set of updates excludes the complete at least one digital representation of at least a portion of the environment in which the robot operates at the second time.

9. The processor based robotic system of claim 8, further comprising:
a robot, wherein the robot comprises two or more imaging sensors operable to collect at least one set of image sensor output data.

10. The processor based robotic system of claim 8, further comprising:
a human interface device comprising one or more displays, the human interface device communicatively coupled to the at least one processor and operable that visually present the at least one digital representation and updates as a virtual presentation.

11. The processor based system of claim 8 wherein the instructions, when executed, cause the robotic system further to:
extract symbolic information regarding the digital representation, the symbolic information comprising at least one of: volumes of objects, boundaries of objects, locations of objects, velocity of objects, or mass of objects.

12. A method in a multi-processor-based system to provide a virtual environment representation of a real environment in which a robotic system operates, the method comprising:
creating, by a first processor that is local to a robot, a first digital representation of at least a portion of an environment in which the robot is located based at least in part on images of at least one view provided by at least one image sensor coupled to or part of the robot;
transmitting the first digital representation in its entirety from the first processor that is local to the robot to a second processor that is remote from the robot;
causing a display of the first digital representation by the second processor that is remote from the robot;
generating, by the first processor that is local to the robot, updates to the first digital representation of the at least a portion of the environment in which the robot is located as further images are provided by the at least one image sensor;
transmitting the updates from the first processor that is local to the robot to the second processor that is remote from the robot, wherein the updates include information pertaining to changes in the first digital representation but exclude the first digital representation; and updating, by the second processor that is remote from the robot, the first digital representation to produce a second digital representation of at least a portion of the environment in which the robot is located based on the updates; and causing a display of the second digital representation by the second processor that is remote from the robot.

13. The method of claim 12, further comprising:

concurrently capturing images by each of at least two image sensors, a first one of the at least two image sensors positioned or oriented differently from a second one of the at least two image sensors to provide perspective in the captured images.

14. The method of claim 13 wherein: creating, by a first processor that is local to a robot, a first digital representation of at least a portion of an environment in which the robot is located based includes generating, by the first processor that is local to the robot, a three-dimensional mapping of one or more portions of the environment, the one or more portions of the environment including at least one of: one or more objects, one or more surfaces, one or more obstacles, one or more humans, or one or more animals present in the environment.

15. The method of claim 14 wherein creating, by the first processor that is local to the robot, the first digital representation of at least a portion of an environment in which the robot is located includes: creating, by the first processor that is local to the robot, the first digital representation that represents at least one of: one or more locations, one or more velocities, one or more accelerations, one or more forces, one or more masses, one or more volumes, one or more orientations, one or more momentums, or one or more torques in the three-dimensional mapping of one or more portions of the environment.

16. The method of claim 14 wherein: generating, by the first processor that is local to the robot, the three-dimensional mapping of one or more parts of the environment includes performing photogrammetry on the captured images to determine at least one of relative spacing or orientation.

17. The method of claim 16 wherein: generating, by the first processor that is local to the robot, the three-dimensional mapping of one or more parts of the environment includes using a neural network or support vector machine on the captured images to detect the one or more portions of the environment.

18. The method of claim 16 wherein creating, by the first processor that is local to the robot, the first digital representation of at least a portion of an environment in which the robot is located includes: creating, by the first processor that is local to the robot, the first digital representation that represents: a set information that represents a certainty of a presence of at least one of: one or more objects, one or more surfaces, one or more obstacles, one or more humans, or one or more animals that were previously detected outside of the views provided by the image sensors.

19. The method of claim 18, further comprising:

generating, by the first processor that is local to the robot, the set of information that represents a certainty based at least in part on a period of time in which one or more of the three-dimensional mapping of one or more portions of the environment were most recently detected in the field-of-view of one or more image sensors.

* * * * *